(12) United States Patent
Fujisawa

(10) Patent No.: US 8,111,328 B2
(45) Date of Patent: Feb. 7, 2012

(54) IMAGE SIGNAL PROCESSING APPARATUS, IMAGE DISPLAY, AND IMAGE DISPLAY METHOD

(75) Inventor: Tomoichi Fujisawa, Kanagawa (JP)

(73) Assignee: Sony Corporation (JP)

(*) Notice: Subject to any disclaimer, the term of this patent is extended or adjusted under 35 U.S.C. 154(b) by 1280 days.

(21) Appl. No.: 11/810,987

(22) Filed: Jun. 6, 2007

(65) Prior Publication Data

US 2007/0296866 A1 Dec. 27, 2007

(30) Foreign Application Priority Data

Jun. 8, 2006 (JP) ................. P2006-159315

(51) Int. Cl.
  *H04N 5/46* (2006.01)
  *H04N 5/14* (2006.01)
  *H04N 9/64* (2006.01)
(52) U.S. Cl. .............. 348/556; 348/558; 348/571
(58) Field of Classification Search .............. None
See application file for complete search history.

(56) References Cited

U.S. PATENT DOCUMENTS

| 7,538,821 B2 * | 5/2009 | Ahn et al. ............ 348/558 |
| 2005/0008327 A1 | 1/2005 | Shinkai |
| 2005/0094033 A1 * | 5/2005 | Schoner et al. ........ 348/558 |

FOREIGN PATENT DOCUMENTS

| EP | 1005225 | 5/2000 |
| EP | 1206135 | 5/2002 |
| EP | 1416489 | 5/2004 |
| EP | 1441356 | 7/2004 |
| EP | 1486979 | 12/2004 |
| JP | 08-256302 A | 10/1996 |
| JP | 2588999 B2 | 3/1997 |
| JP | 10-513015 | 12/1998 |
| JP | 2004186803 A | 7/2004 |
| JP | 2004201238 A | 7/2004 |
| JP | 2005107437 A | 4/2005 |
| JP | 2005-203933 A | 7/2005 |
| WO | WO-2004/044904 | 5/2004 |

OTHER PUBLICATIONS

Office Action from Japan Application No. 2006-159315, dated Oct. 11, 2011.

* cited by examiner

*Primary Examiner* — Jefferey Harold
*Assistant Examiner* — Sean Haiem
(74) *Attorney, Agent, or Firm* — Lerner, David, Littenberg, Krumholz & Mentlik, LLP

(57) ABSTRACT

An image signal processing apparatus, an image display, and an image display method that enable detecting a black band region included in an input image signal in a shorter time and realizes a more viewable image are provided. The image signal processing apparatus includes a black band detecting means for detecting in a unit frame period a black band region included in an input image signal, a calculating means for calculating a scaling ratio of the input image signal while maintaining an aspect ratio thereof based on a detection result from the black band detecting means, and a scaling means for scaling the input image signal up or down based on the ratio obtained by the calculating means.

3 Claims, 28 Drawing Sheets

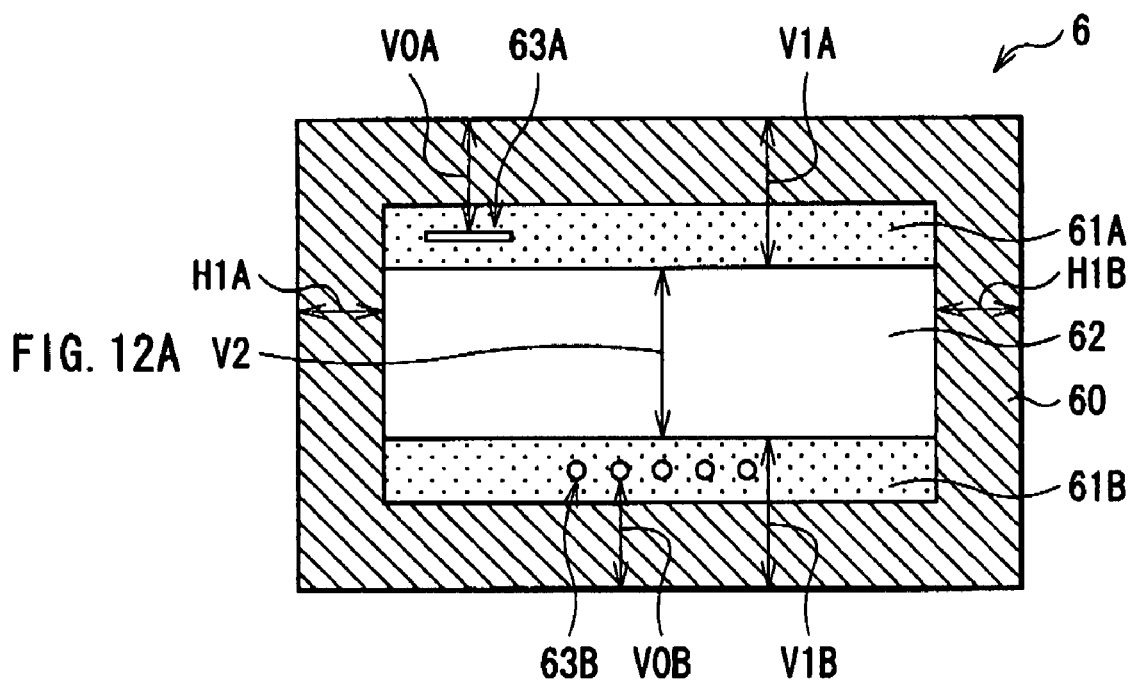
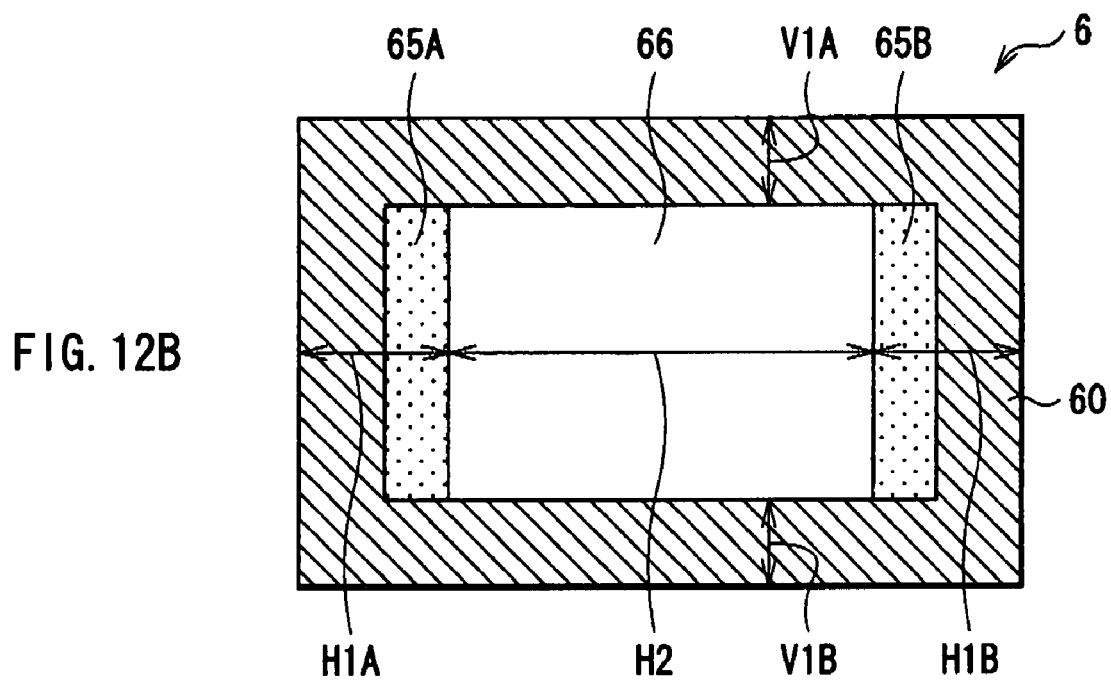

IMAGE SIGNAL PROCESSING APPARATUS, IMAGE DISPLAY, AND IMAGE DISPLAY METHOD

CROSS REFERENCE TO RELATED APPLICATIONS

The present application claims priority from Japanese Patent Application No. JP 2006-159315, filed in the Japanese Patent Office on Jun. 8, 2007, the entire content of which is incorporated herein by reference.

BACKGROUND OF THE INVENTION

1. Field of the Invention

The present invention relates to an image signal processing apparatus, an image display, and an image display method that perform image processing by using detection results of a black band region included in an image signal.

2. Description of the Related Art

In general, an image display such as a television receiver (TV) includes an image processing function to provide an input image with image quality correction (for example, functions such as luminance or contrast control and contour correction). Such an image processing function is achieved by acquiring, for example, the average peak level (APL) of input image signals or histogram distribution of luminance levels, and is effectively applied, because gradation is improved by preventing an image from appearing too dark or preventing poor reproduction of black.

Further, some of recent TVs include a function to display an image by scaling an input image signal. Then, in scaling the input image signal as above, it is necessary to consider whether a black band region is included in the input image signal. The black band region is included in, for example, an image signal of a DVD (Digital Versatile Disk) recorded in the Cinemascope size or an image signal sent from a broadcast station. As a method thereof, there are a method called letterbox including the black band regions above and below an image region, and a method called side panel including the black band regions on the right and left of an image region. To scale the input image signal including the black band region as above, it is necessary to detect the black band region to prevent the black band region from being displayed on the display screen.

In this regard, to effectively detect the black band region included in the input image signal as above, various methods have been proposed (for example, refer to Japanese Unexamined Patent Application Publication Nos. 2005-203933 and H08-256302, and Japanese Patent No. 2588999).

SUMMARY OF THE INVENTION

However, in the detection methods disclosed in Japanese Unexamined Patent Application Publication Nos. 2005-203933 and H08-256302, and Japanese Patent No. 2588999, the presence or absence of the black band region is determined on a line-by line basis in each frame, so it takes a very long time to detect the whole black band region. Therefore, for example, when scenes are changed, a detecting process goes back to the beginning during the middle of the detecting process, and thus the detecting process may not be completed. In recent years, for example, like full HD (High Definition) TVs, the resolution of the image displays are increased, so it is extremely important to appropriately perform a black band detecting process in a short time.

In Japanese Unexamined Patent Application Publication No. 8-256302, in scaling the input image signal, the aspect ratio is converted. Therefore, it is difficult to faithfully display an image in according to the original image signal. In the result, in some cases, the displayed image is not easily viewable for viewers.

In view of the foregoing, in the invention, it is desirable to provide an image signal processing apparatus, an image display, and an image display method that can detect a black band region included in an input image signal in a shorter time and can display an easily viewable image.

According to an embodiment of the invention, there is provided an image signal processing apparatus including a black band detecting means for detecting in a unit frame period a black band region included in an input image signal, a calculating means for calculating a scaling ratio of the input image signal while maintaining an aspect ratio thereof based on a detection result from the black band detecting means, and a scaling means for scaling the input image signal up or down based on the ratio obtained by the calculating means.

The "unit frame" means one or more image frames, or one or more image fields.

According to an embodiment of the invention, there is provided an image display including a display means for displaying an image based on the scaled image signal scaled up or down by the scaling means, in addition to the black band detecting means, the calculating means, and the scaling means that are described above.

According to an embodiment of the invention, there is provided an image display method including the steps of: detecting in a unit frame period a black band region included in an input image signal; calculating scaling ratio while maintaining an aspect ratio of the input image signal based on a detection result from the black band region; scaling the input image signal up or down based on the obtained ratio; and displaying an image based on the scaled image signal.

In the image signal processing apparatus, the image display, and the image display method of the embodiment of the invention, the black band region included in the input image signal is detected in the unit frame period. Further, based on the detection result from the black band region, the scaling ratio is calculated while the aspect ratio of the input image signal is maintained. Then, based on the obtained ratio, the input image signal is scaled up or down.

According to the image signal processing apparatus, the image display, and the image display method of the embodiment of the invention, the black band region included in the input image signal is detected in the unit frame period. In addition, based on the detection result from the black band region, the scaling ratio is calculated while the aspect ratio of the input image signal is maintained. Then, based on the obtained ratio, the input image signal is scaled up or down. Therefore, the black band region included in the input image signal can be detected in a shorter time, and the image display can be more easily viewed.

Other and further objects, features and advantages of the invention will appear more fully from the following description.

BRIEF DESCRIPTION OF THE DRAWINGS

FIGS. 12A and 12B are schematic views for explaining the black band detecting process;

DETAILED DESCRIPTION OF THE PREFERRED EMBODIMENT

An embodiment of the invention will be hereinafter described in detail with reference to the drawings.

Figure 1:
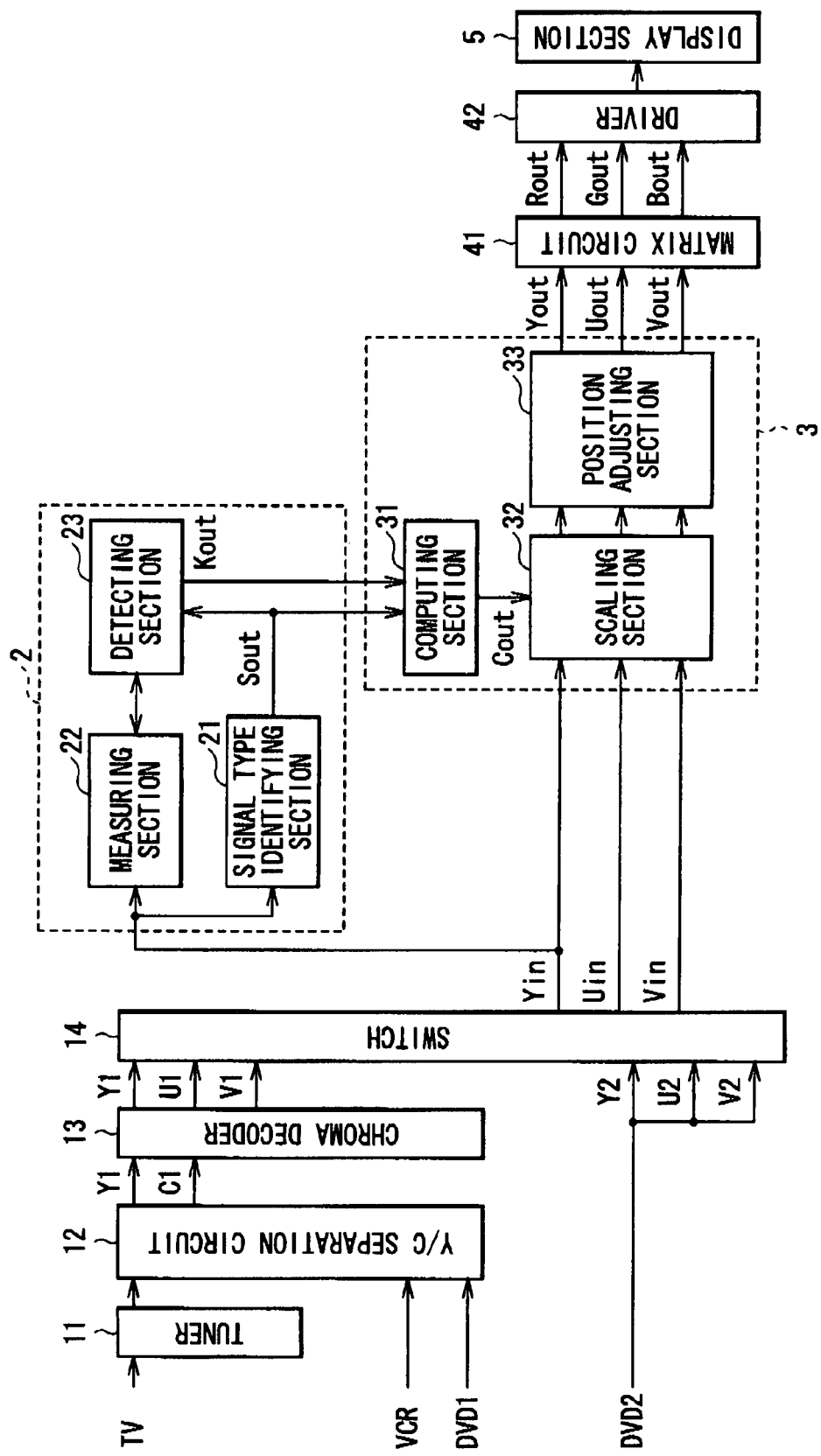
FIG. 1 is a block diagram showing a whole structure of an image display according to an embodiment of the invention.

FIG. 1 shows a whole structure of an image display according to an embodiment of the invention. The image display includes a tuner 11, a Y/C separation circuit 12, a chroma decoder 13, a switch 14, a black band detecting section 2, an image processing section 3, a matrix circuit 41, a driver 42, and a display section 5. Since an image signal processing apparatus and an image display method according to an embodiment of the invention are embodied by the image display according to this embodiment, descriptions thereof will be given herein together.

Image signal inputted to the image display unit may be outputs from a VCR (Video Cassette Recorder), a DVD or the like as well as a television signal from a TV. It has become common practice for recent televisions and personal computers (PC) to obtain image information from a plurality of media and display an image corresponding to each of the media.

The tuner 11 receives and demodulates the television signal from the TV, and outputs the television signal as a composite video burst signal (CVBS).

The Y/C separation circuit 12 separates the composite video burst signal from the tuner 11 or a composite video burst signal from a VCR or a DVD 1 into a luminance signal Y1 and a chrominance signal C1 to output them.

The chroma decoder 13 outputs the luminance signal Y1 and the chrominance signal C1 that are separated by the Y/C separation circuit 12 as YUV signals (Y1, U1, V1) including the luminance signal Y1, and color-difference signals U1 and V1.

The YUV signals are image data of a two-dimensional digital image, and a set of pixel values corresponding to a position on an image. A luminance signal Y represents a luminance level, and takes an amplitude value between a white level which is 100% white and a black level. Moreover, a 100% white image signal is 100 (IRE) in a unit called IRE (Institute of Radio Engineers) representing a relative ratio of an image signal. The black level is 0 IRE. On the other hand, the color-difference signals U and V correspond to a signal B-Y produced by subtracting the luminance signal Y from blue (B), and a signal R-Y produced by subtracting the luminance signal Y from red (R), respectively, and when the signals U and V are combined with the luminance signal Y, colors (hue, chroma saturation, luminance) can be shown.

The switch 14 switches YUV signals from a plurality of media (in this case, the YUV signals (Y1, U1, V1) and YUV signals (Y2, U2, V2) from a DVD 2), to output selected signals as YUV signals (Yin, Uin, Vin).

The black band detecting section 2 detects a black band region included in the YUV signals (Yin, Uin, Vin) as input image signals. Specifically, the black band detecting section 2 detects the black band region based on the luminance signal Yin to output a detection result Kout to the after-mentioned image processing section 3. The black band detecting section 2 has a signal type identifying section 21, a measuring section 22, and a detecting section 23.

Figure 2:
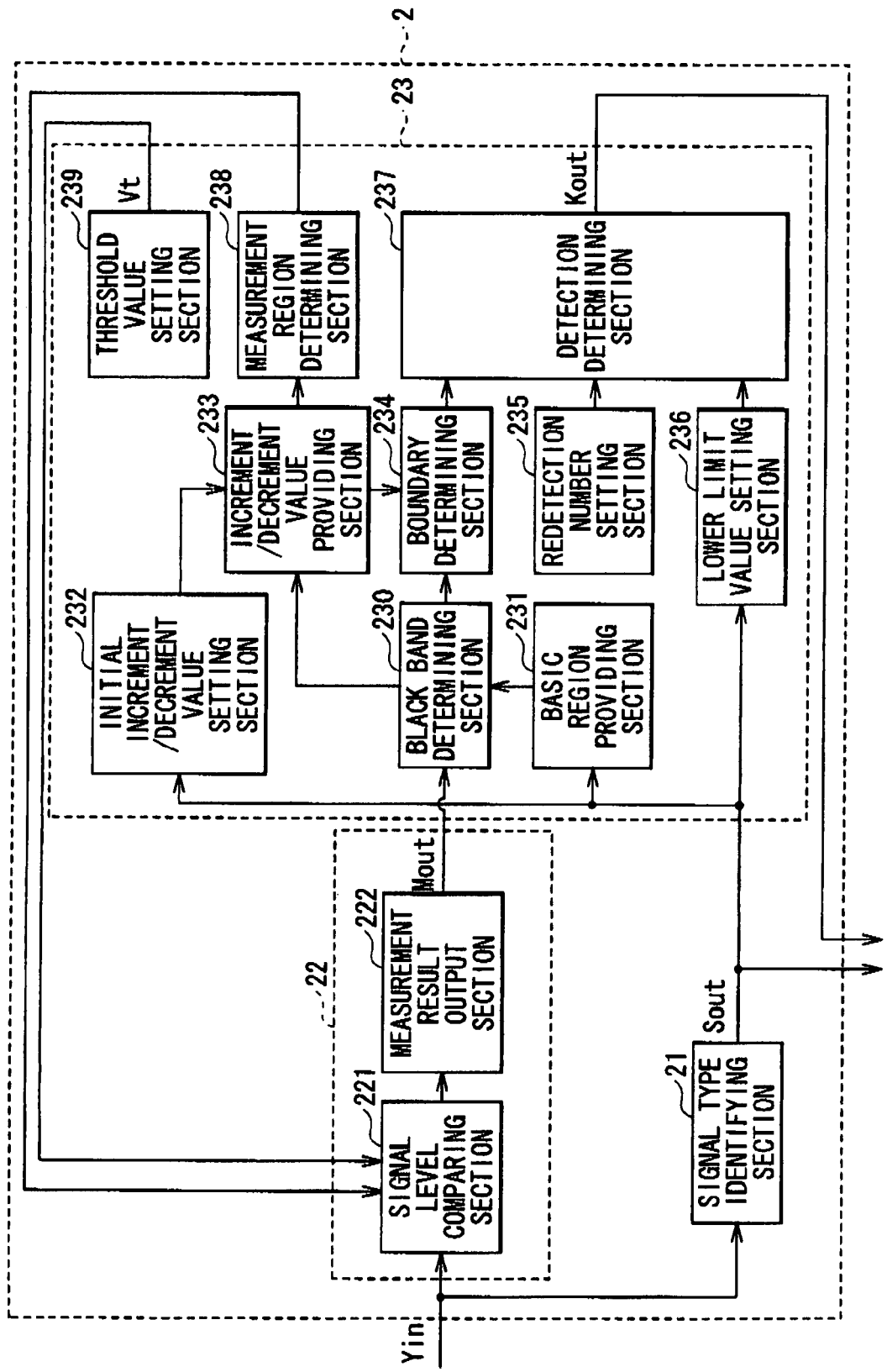
FIG. 2 is a block diagram showing a detailed structure of a black band detecting section shown in FIG. 1.

FIG. 2 shows a detailed structure of the black band detecting section 2.

The signal type identifying section 21 identifies the type of the input image signal. Specifically, for example, the signal type identifying section 21 identifies the signal type such as an NTSC 480i signal and a PAL (Phase Alternating Line) 576i signal.

The measuring section 22 has a signal level comparing section 221 and a measurement result output section 222. The measuring section 22 performs a given measurement on a designated measurement region in the input image signals in a unit frame period. More specifically, the measuring section 22 measures whether the signal level of each pixel in the measurement region is less than a threshold value Vt set on the basis of the luminance signal Yin.

Figure 3A:
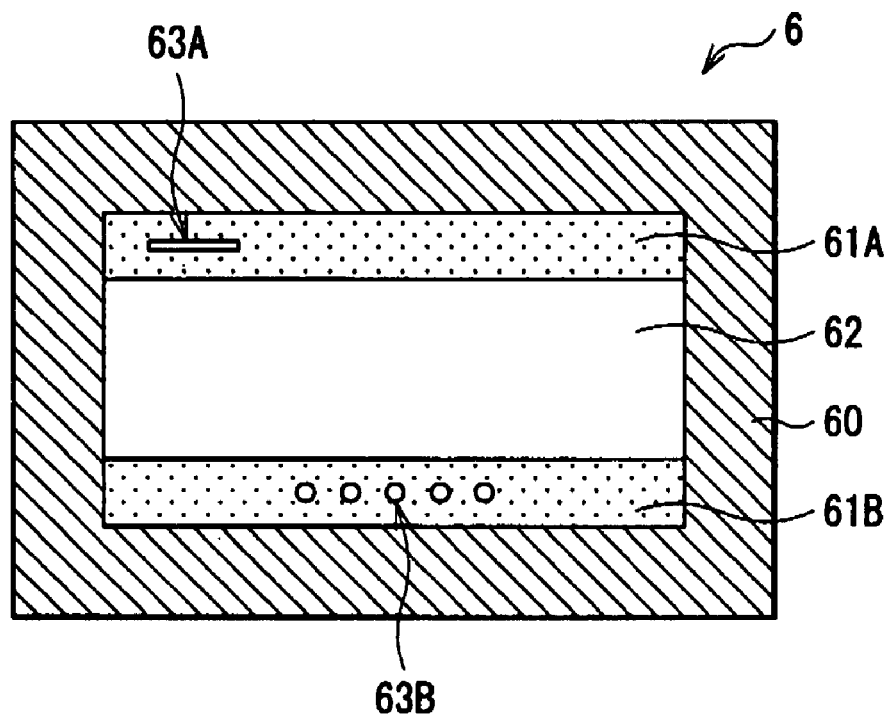
FIGS. 3A and 3B are schematic views for explaining an input image signal having black band regions.
Figure 3B:
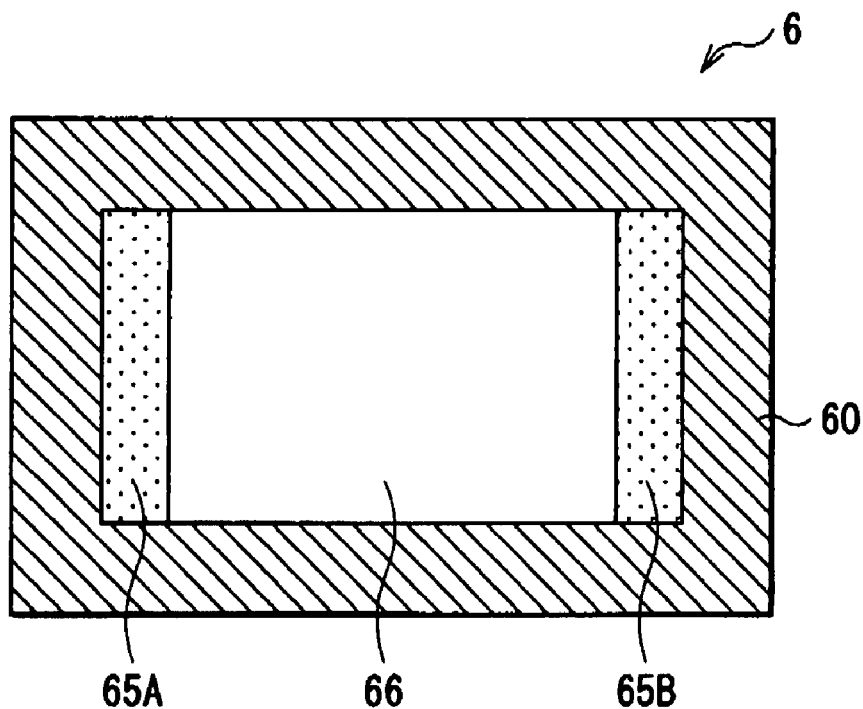

FIGS. 3A and 3B are schematic views of each region in the case that the black band regions are included in an input image signal 6. FIG. 3A shows a case that black band regions 61A and 61B are provided above and below an image region 62. This case corresponds to, for example, a CinemaScope size image signal or the like. An OSD (On Screen Display) 63A is inserted in the black band region 61A, and subtitles 63B are inserted in the black band region 61B. Around the image region 62 and the black band regions 61A and 61B, a blanking region 60 is provided. Meanwhile, FIG. 3B shows a case that black band regions 65A and 65B are provided on the right and left of an image region 66. This case corresponds to, for example, a side panel image signal or the like. Around the image region 66 and the black band regions 65A and 65B, a blanking region 60 is provided. The OSD or the subtitles may or may not be inserted in the black band regions. If inserted, the insertion position may be one of the positions above and below an image region or one of the positions on the right and left of an image region, or may be both positions thereof.

Figure 4A:
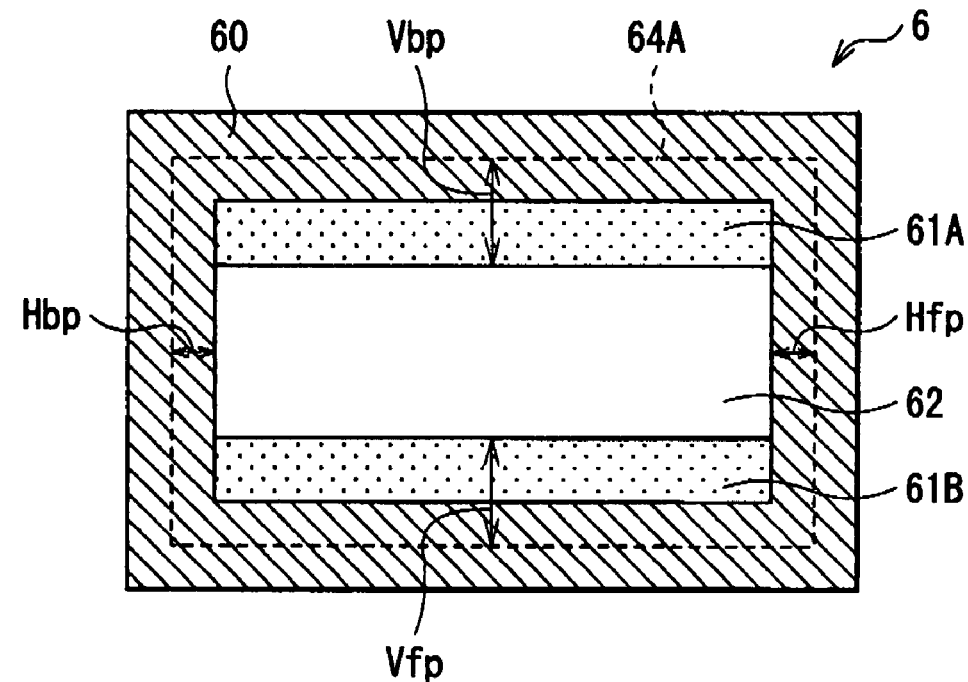
FIGS. 4A and 4B are schematic views for explaining measuring process by a measuring section.
Figure 4B:
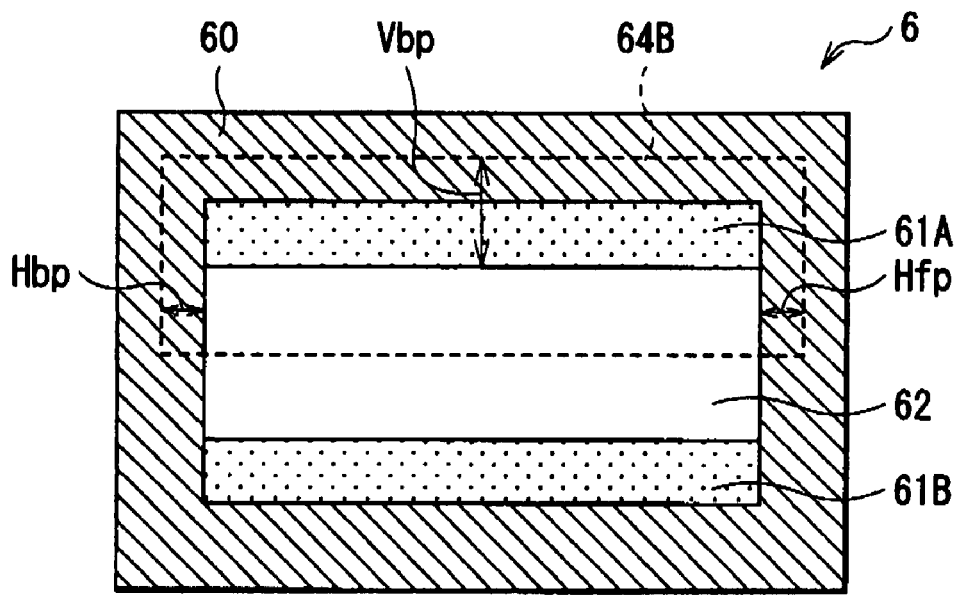

For example, as shown in FIG. 4A, the signal level comparing section 221 compares a signal level of the luminance signal Yin in each pixel to the signal level of the set threshold value Vt in the designated measurement region 64A of the input image signal 6 in the unit frame period, and outputs pixel positions with the signal level equal to or larger than the threshold value Vt. The threshold value Vt is set, for example, to output the pixel position of the image region 62 and not to output the pixel positions of the blanking region 60 and the black band regions 61A and 61B.

The measurement result outputting section 222 determines and outputs a horizontal back porch length Hbp, a horizontal front porch length Hfp, a vertical back porch length Vbp, and a vertical front porch length Vfp in the measurement region 64A as shown in FIG. 4A, based on the pixel position with a signal level equal to or larger than the threshold value Vt which is outputted from the signal level comparing section 221. The measurement region 64A in FIG. 4A shows a case that the measurement region 64A is the basic region as a basic part for detecting the black band. However, like a measurement region 64B shown in FIG. 64B, the zone of a measurement region can be freely set. The increase and decrease in the zone of the measurement region will be described later.

The detecting section 23 detects the black band region actually included in the input image signal 6, based on the measurement results of the horizontal back porch length Hbp, the horizontal front porch length Hfp, the vertical back porch length Vbp, and the vertical front porch length Vfp measured by the measuring section 22, and a signal type identifying result Sout identified by the signal type identifying section 21. The detecting section 23 has a black band determining section 230, a basic region providing section 231, an initial increment/decrement value setting section 232, an increment/decrement value providing section 233, a boundary determining section 234, a redetection number setting section 235, a lower limit value setting section 236, a detection determining section 237, a measurement region determining section 238, and a threshold value setting section 239.

The black band determining section 230 determines whether a measurement result Mout including the horizontal back porch length Hbp, the horizontal front porch length Hfp, the vertical back porch length Vbp, and the vertical front porch length Vfp measured by the measuring section 22 is a measurement result from a black band region.

Figure 5:
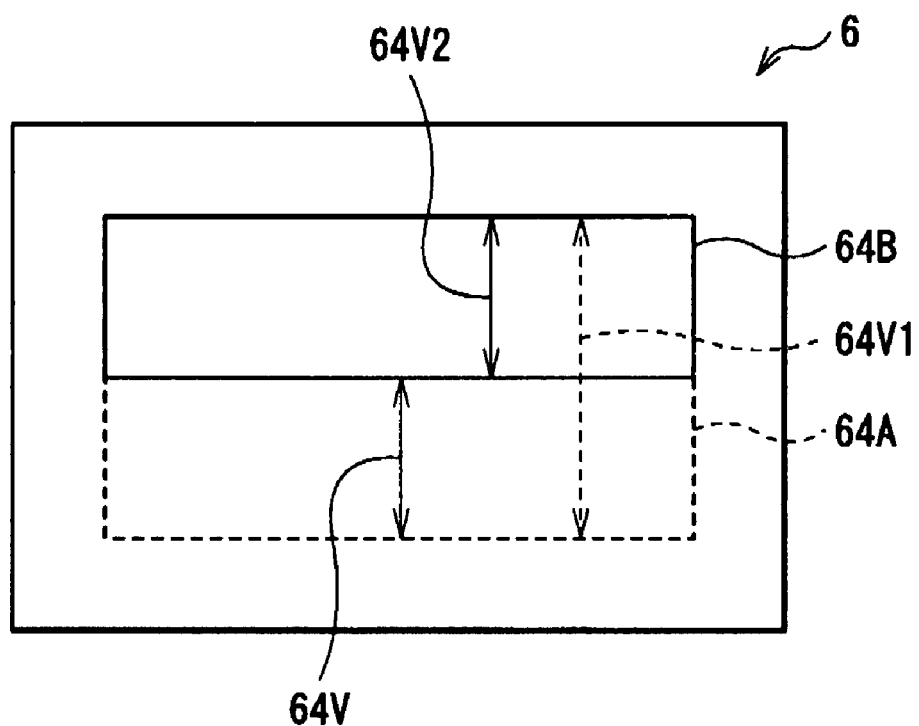
FIG. 5 is a schematic view for explaining an increment/decrement value of a measurement region.

The basic region providing section 231 sets the basic region as a basic part for detecting the black band. According to the signal type identifying result Sout determined by the signal type identifying section 21, for example, the basic region 64A in the input image signal 6 is set as shown in FIG. 5. The initial increment/decrement value setting section 232 is a section for setting an initial value of a change amount (increment/decrement value) when the measurement region measured by the measuring section 22 is changed. For example, as shown in FIG. 5, the increment/decrement value is shown like an increment/decrement value 64V, when the measurement region is changed from the measurement region 64A to the measurement region 64B in the vertical direction. The increment/decrement value in the horizontal direction is shown in the same manner as in the vertical direction. The initial increment/decrement value setting section 232 sets the initial increment/decrement value to a power-of-two value ($2^n$) (n: natural number) according to the signal type identifying result Sout determined by the signal type identifying section 21. Specifically, for example, when the input image signal 6 is an NTSC 525i signal, the initial increment/decrement value is set to 64. When the input image signal 6 is 525p signal converted into a progressive signal, the initial increment/decrement value is set to 128.

The increment/decrement value providing section 233 provides the increment/decrement value of the measurement region, based on the initial increment/decrement value set by the initial increment/decrement value setting section 232 and the determination result determined by the black band determining section 230. Specifically, an absolute increment/decrement value starts from the initial value set by the initial increment/decrement value setting section 232. One half of the previous increment/decrement value is reset as a new increment/decrement value in each measurement of one unit frame. Whether the absolute increment/decrement value is added to or subtracted from the current measurement region is determined according to the determination result determined by the black band determining section 230 which will be described later.

The boundary determining section 234 determines boundaries between the black band regions 61A, 61B, 65A and 65B and the image regions 62 and 66, based on the determination result determined by the black band determining section 230 and the increment/decrement value of the measurement region provided by the increment/decrement value providing section 233.

Figure 6:
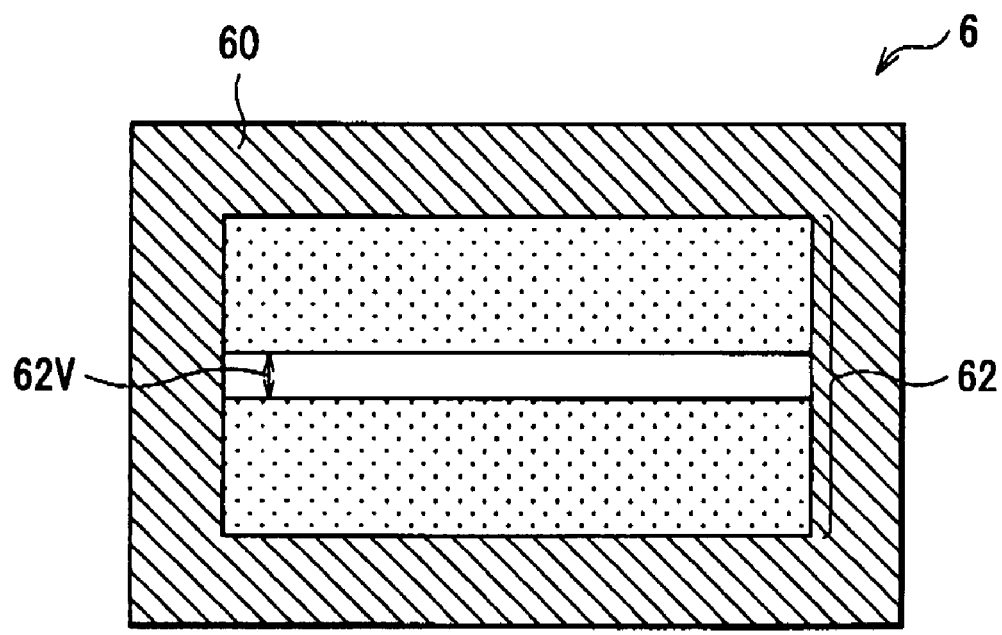
FIG. 6 is a schematic view for explaining the lower limit value of a width of an image region.

The redetection number setting section 235 sets the redetection number when the black band region is finally determined in the after-mentioned detection determining section 237. The redetection number is represented by an integer number of 0 or more. The lower limit value setting section 236 sets a lower limit value of the horizontal width or the vertical width of the image region 62 calculated based on the boundary of the black band region determined by the boundary determining section 234 according to the signal type identifying result Sout determined by the signal type identifying section 21. In the case of the vertical width of the image region 62, for example, the lower limit value is expressed as a vertical width 62V shown in FIG. 6. By setting the vertical width 62V as the lower limit value, false detection in a dark scene or the like (FIG. 6 shows a case that no black band region is present in the input image signal 6, and a dark scene or the like by the image signal 6 is displayed) is prevented.

The detection determining section 237 finally determines the black band region included in the input image signal 6, based on the boundary determination result of the black band region determined by the boundary determining section 234, the redetection number set by the redetection number setting section 235, and the lower limit value of the image region width set by the lower limit value setting section 236 and outputs the determined black band detection result Kout to the image processing section 3.

The measurement region determining section 238 determines a measurement region measured by the measuring section 22 based on the increment/decrement value of the measurement region provided by the increment/decrement value providing section 233, and sequentially outputs the measurement region to the signal level comparing section 221. The threshold value setting section 239 sets the threshold value Vt of the signal level used in measurement by the measuring section 22, and outputs the threshold value Vt to the signal level comparing section 221. As described above, a region with the signal level under the threshold value Vt in the measurement region may be a black band region.

The description will be given with reference to FIG. 1 again. The image processing section 3 performs image processing for the YUV signals (Yin, Uin, Vin) as the input image signals, based on the black band detection result Kout by the black band detection section 2 and the signal type identifying result Sout of the input image signal determined by the signal type identifying section 21 in the black band detecting section 2. Specifically, while the image processing section 3 maintains an aspect ratio of the input image signal, the image processing section 3 performs a process of increasing or decreasing the input image signal (aspect ratio adjustment process). The image processing section 3 has a computing section 31 that computes the scaling ratio of the input image signal based on a display size (the number of pixels) of the display section 5, the black band detection result Kout, and the type identifying result Sout; a scaling section 32 that scales the YUV signals (Yin, Uin, Vin) as the input image signals based on a computing result Cout (scaling ratio) by the computing section 31; and a position adjusting section 33 that performs position adjustment on the scaled image signals to prevent loss of the subtitles in the black band region by the scaling section 32.

The matrix circuit 41 reproduces RGB signals from the YUV signals (Yout, Uout, Vout) after image processing (aspect ratio adjustment process) by the image processing section 3 and outputs the reproduced RGB signals (Rout Gout, Bout) to the driver 42.

The driver 42 produces a driving signal for the display section 5, based on the RGB signals (Rout Gout, Bout) outputted from the matrix circuit 41, and outputs the driving signal to the display section 5.

The display section 5 displays an image based on the YUV signals (Yout, Uout, Vout) after the image processing (aspect ratio adjustment process) by the image processing section 3, according to the driving signal outputted from the driver 42. The display section 5 may be any type of display device. For example, a CRT (Cathode-Ray Tube), an LCD (Liquid Crystal Display), a PDP (Plasma Display Panel), an organic or an inorganic EL (Electroluminescence) display or the like is used.

Next, a description will be given of operations of the image display of this embodiment. First, a description will be given of basic operations of the image display.

First, an image signal to be inputted into the image display is demodulated into the YUV signals. Specifically, a television signal from a TV is demodulated into a composite video burst signal by the tuner 11. From the VCR or the DVD1, a composite video burst signal is directly inputted into the image display. The composite signals are separated into the luminance signal Y1 and the chrominance signal C1 in the Y/C separation circuit 12, and decoded into the YUV signals (Y1, U1, V1) in the chroma decoder 13. Meanwhile, from the DVD 2, the YUV signals (Y2, U2, V2) are directly inputted into the image display.

Next, one of the YUV signals (Y1, U1, V1) and the YUV signals (Y2, U2, V2) are selected at the switch 14, and outputted as the YUV signals (Yin, Uin, Vin). Then, of the YUV signals (Yin, Uin, Vin), the luminance signal Yin is outputted to the signal type identifying section 21 and the measuring section 22 in the black band detecting section 2 and to the scaling section 32 in the image processing section 3, respectively. The color-difference signals Uin and Vin are respectively outputted to the scaling section 32 in the image processing section 3.

In this case, in the black band detecting section 2, the black band region included in the YUV signals (Yin, Uin, Vin) as the input image signals is detected. Specifically, the black band region is detected based on the luminance signal Yin, and the detection result Kout is outputted to the image processing section 3. More specifically, the measuring section 22 measures whether the luminance signal Yin in each pixel in the designated measurement region of the input image signals has a signal level less than the threshold value Vt in the unit frame period. The detecting section 23 detects the black band region included in the input image signal 6 on the measurement results of the horizontal back porch length Hbp, the horizontal front porch length Hfp, the vertical back porch length Vbp, and the vertical front porch length Vfp measured by the measuring section 22, and the signal type identifying result Sout determined by the signal type identifying section 21, and the black band detection result Kout is outputted to the image processing section 3.

Based on the black band detection result Kout by the black band detecting section 2 and the signal type identifying result Sout of the input image signal determined by the signal type identifying section 21, the image processing section 3 performs image processing, more specifically a process of scaling the input image signal while maintaining the aspect ratio (aspect ratio adjustment process) on the YUV signals (Yin, Uin, Vin) as the input image signals.

Next, in the matrix circuit 41, the YUV signals (Yout, Uout, Vout) after the image processing (aspect ratio adjustment process) by the image processing section 3 is reproduced as the RGB signals (Rout Gout, Bout). In the driver 42, the driving signal is generated based on the RGB signals (Rout Gout, Bout), and an image is displayed on the display section 5 based on the driving signal.

Next, a description will be given of details of the measuring process by the measuring section 22 that is one of the characteristics of the invention, with reference to FIG. 7 to FIG. 10.

FIG. 7 to FIG. 10 are timing charts that respectively show an example of measurement methods of the horizontal back porch length Hbp, the horizontal front porch length Hfp, the vertical back porch length Vbp, and the vertical front porch length Vfp measured by the measuring section 22. In these charts, Hsync represents a horizontal synchronizing signal, Vsync represents a vertical synchronizing signal, Clock represents a clock (dot clock) signal corresponding to the period of every pixel, H_act represents a horizontal active signal corresponding to the pixel position with the signal level of the threshold value Vt or higher in the horizontal direction, V_act represents a vertical active signal that becomes active when the horizontal active signal H_act of at least 1 pixel attains "H" level in each one horizontal period, Hbp_cnt represents a horizontal back porch counter output, Hfp_cnt represents a horizontal front porch counter output, Vbp_cnt represents a vertical back porch counter output, Vfp_cnt represents a vertical front porch counter output, Hbp_lat represents a horizontal back porch latch output corresponding to a latched (maintained) established value of the horizontal back porch counter output Hbp_cnt in the previous horizontal period, Hfp_lat represents a horizontal front porch latch output corresponding to a latched established value of the horizontal front porch counter output Hfp_cnt in the previous horizontal period, Hbp_out represents a horizontal back porch length output that is finally outputted as an established value of the horizontal back porch length Hbp, Hfp_out represents a horizontal front porch length output that is finally outputted as an established value of the horizontal front porch length Hfp, Vbp_out represents a vertical back porch length output corresponding to a latched established value of the vertical back porch counter output Vbp_cnt in the previous vertical period and that is finally outputted as an established value of the vertical back porch length Vbp, and Vfp_out represents a vertical front porch length output corresponding to a latched established value of the vertical front porch counter output Vfp_cnt in the previous vertical period and that is finally outputted as an established value of the vertical front porch length Vfp. A sign "<" shown in the luminance signal Yin represents a signal level under the threshold value Vt, and a sign ">" shown in the luminance signal Yin represents the signal level of the threshold value or higher.

Figure 7:
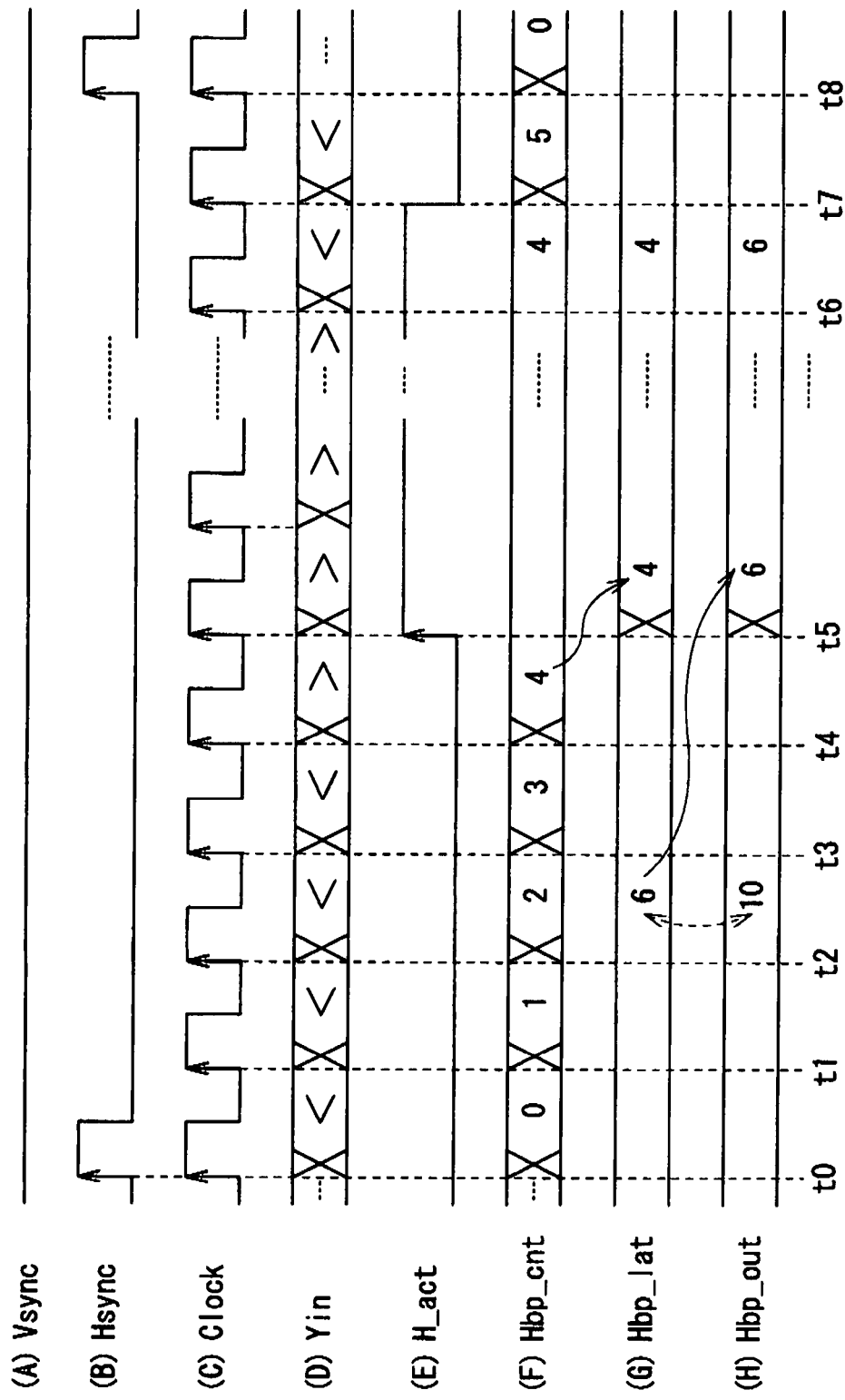
FIG. 7 is a timing chart for explaining a process of measuring a horizontal back porch length.

First, measurement of the horizontal back porch length Hbp shown in FIG. 7 is performed as follows.

When the horizontal synchronizing signal Hsync (FIG. 7(B)) attains "H" level at timing t0, the horizontal back porch counter output Hbp_cnt (FIG. 7(F)) is reset at the rising edge thereof, and "0" is outputted. Then, on and after the timing t0, at each of the rising edges (timings t1, t2, and so on) of the clock signal Clock (FIG. 7(C)), the value of the horizontal back porch counter output Hbp_cnt is incremented by one.

Next, when the signal level of the luminance signal Yin (FIG. 7(D)) becomes the threshold value Vt or higher at timing t4, the horizontal active signal H_act (FIG. 7(E)) attains "H" level at timing t5 that is the next rising edge of the clock signal Clock. Then, when the horizontal active signal H_act is in "H" level (timings t5 to t7), the value of the horizontal back porch counter output Hbp_cnt is fixed (fixed to "4" in FIG. 7). The value of the horizontal back porch counter output Hbp_cnt then becomes the established value in the horizontal period, and is updated and maintained as the horizontal back porch larch output Hbp_lat (FIG. 7 (G)). Further, at this time, the value of the horizontal back porch latch output Hbp_lat in the previous horizontal period (before the update) ("6" in FIG. 7) is compared to the value of the horizontal back porch length output Hbp_out corresponding to the minimum value of the horizontal back porch length Hbp in the previous measurement (FIG. 7(H)) ("10" in FIG. 7(H)). After such comparison, the smaller value is updated as a new horizontal back porch length output Hbp_out ("10" is updated to "6" in FIG. 7).

Next, after the luminance signal Yin becomes the signal level under the threshold value Vt again at timing t6, the horizontal active signal H_act returns to "L" level at timing t7 as the next rising edge of the clock signal Clock, and the value of the horizontal back porch counter output Hbp_cnt is again incremented by one. When the horizontal synchronizing signal Hsync attains "H" level at timing t8, the measurement of one horizontal period is completed.

Such measurement of one horizontal period is performed over a unit frame period. Thereby, the horizontal back porch length Hbp determined by the minimum value of the number of pixels under the threshold value Vt continues from the left end of the measurement region 64A or 64B is outputted from the measuring section 22 in a short time in the unit frame period.

Figure 8:
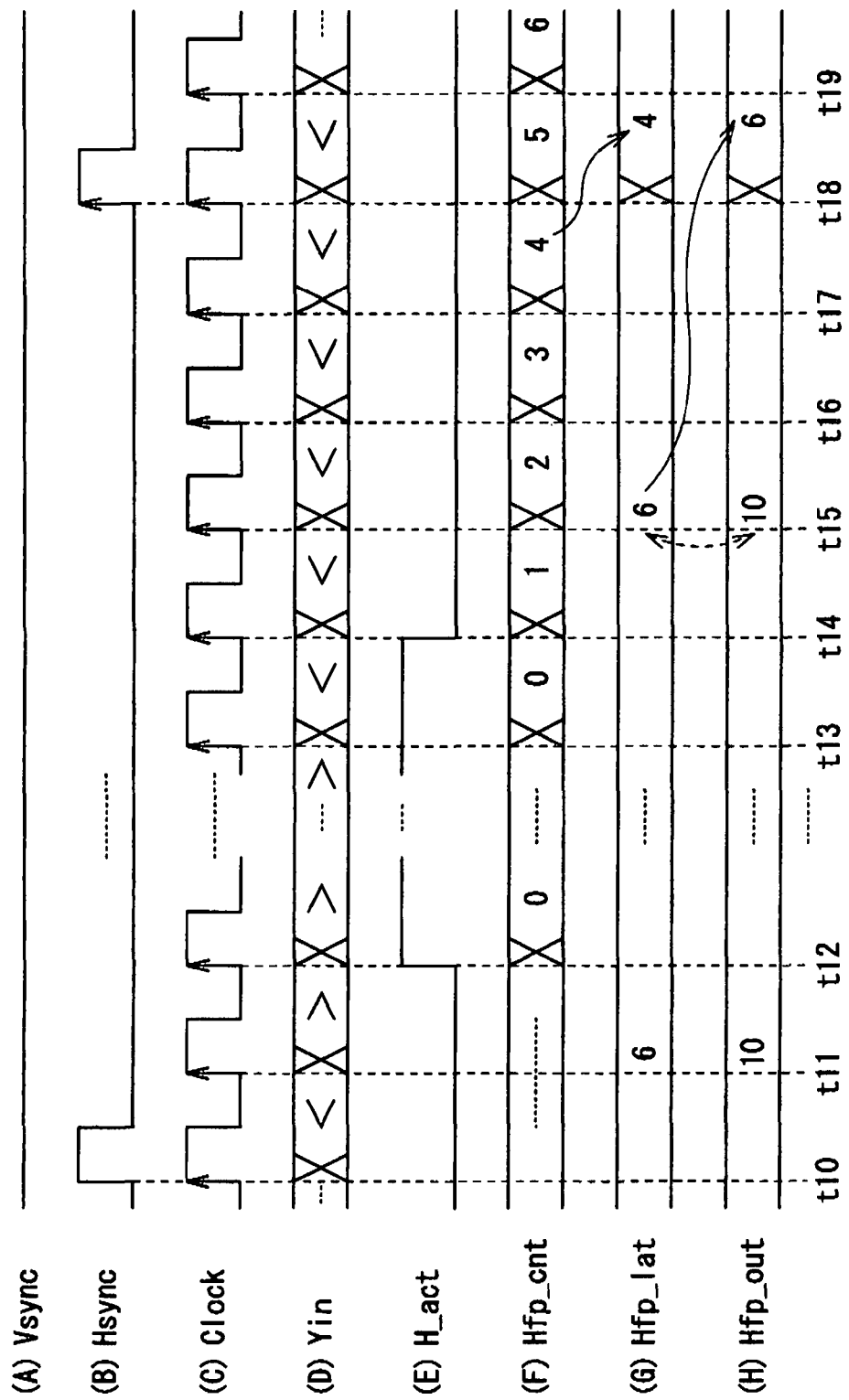
FIG. 8 is a timing chart for explaining a process of measuring a horizontal front porch length.

Further, measurement of the horizontal front porch length Hfp shown in FIG. 8 is performed as follows basically in the same manner as in measuring the horizontal back porch length Hbp.

First, when the horizontal synchronizing signal Hsync (FIG. 8(B)) attains "H" level at timing t10 and the signal level of the luminance signal Yin (FIG. 8(D)) becomes the threshold value Vt or higher at timing t11, the horizontal active signal H_act (FIG. 8(E)) attains "H" level at timing t12 as the next rising edge of the clock signal Clock (FIG. 8(C)). Thereby, while the horizontal active signal H_act is in the "H" level (timings t12 to t14), the horizontal front porch counter output Hfp_cnt (FIG. 8(F)) is reset, and "0" is outputted.

Next, when the signal level of the luminance signal Yin becomes under the threshold value Vt again at timing t13, the horizontal active signal H_act returns to "L" level at timing t14 that is the next rising edge of the clock signal Clock. Thereby, on and after timing t14, (timing t14, t15, and so on), the value of the horizontal front porch counter output Hfp_cnt is incremented by one.

Next, when the horizontal synchronizing signal Hsync attains "H" level again at timing t18, the value of the horizontal front porch counter output Hfp_cnt becomes the established value in the horizontal period, and is updated and maintained as the horizontal front porch larch output Hfp_lat (FIG. 8(G)). Further, at this time, the value of the horizontal front porch latch output Hbp_lat in the previous horizontal period (before the update) ("6" in FIG. 8) is compared to the value of the horizontal front porch length output Hfp_out corresponding to the minimum value of the horizontal front porch length Hfp in the previous measurement (FIG. 8(H)) ("10" in FIG. 8). After such comparison, the smaller value is updated as a new horizontal back porch length output Hfp_out ("10" is updated to "6" in FIG. 8). The measurement of one horizontal period is completed.

Such measurement of one horizontal period is performed over a unit frame period. Thereby, the horizontal front porch length Hfp corresponding to the minimum value of the number of pixels under the threshold value Vt continuously present from the right end of the measurement region 64A or 64B is outputted from the measuring section 22 in a short time in the unit frame period.

Figure 9:
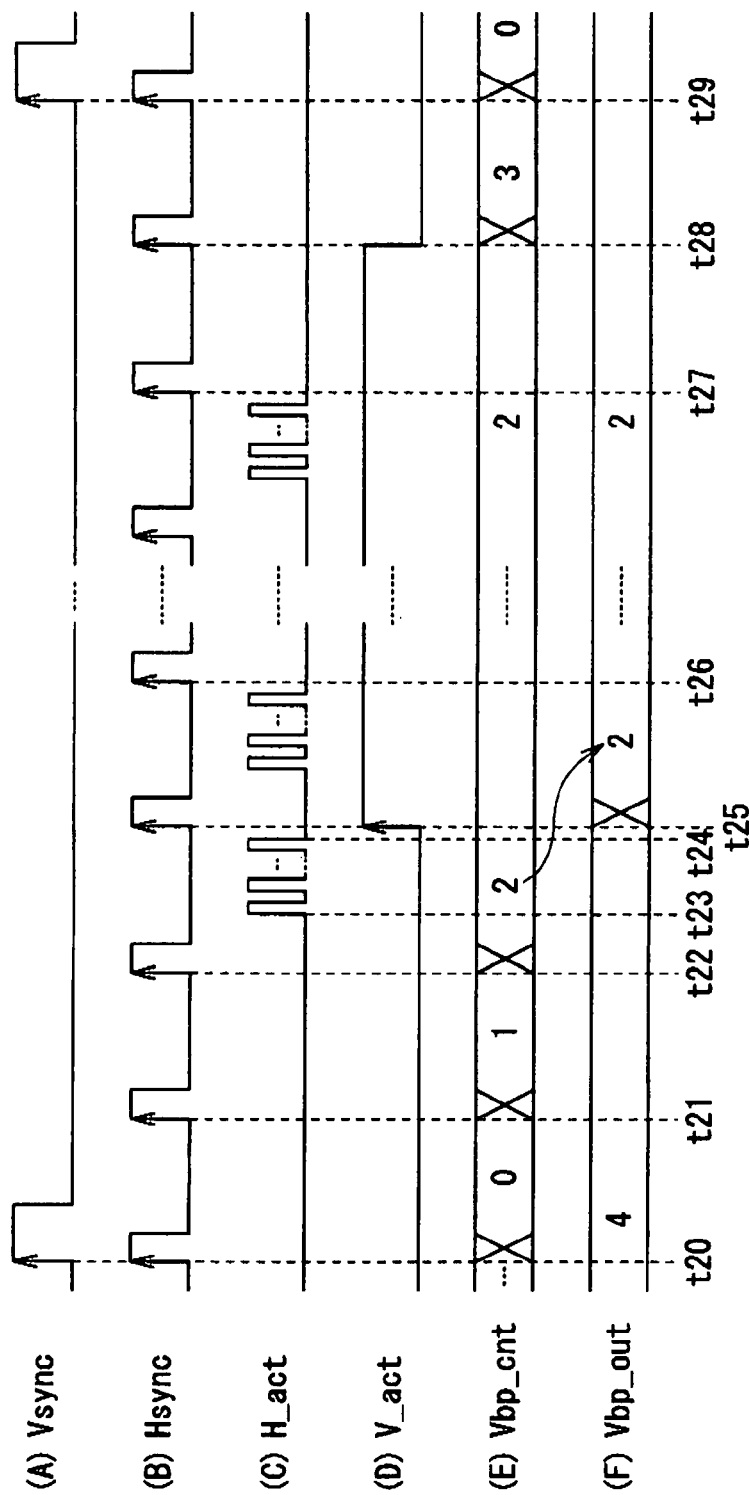
FIG. 9 is a timing chart for explaining a process of measuring a vertical back porch length.

Further, measurement of the vertical back porch length Vbp shown in FIG. 9 is performed as follows.

When the vertical synchronizing signal Vsync (FIG. 9(A)) attains "H" level at timing t20, the vertical back porch counter output Vbp_cnt (FIG. 9(E)) is reset in the rising edge thereof, and "0" is outputted. Then, on and after the timing t20, at each of the rising edges (timing t21, t22, and so on) of the horizontal synchronizing signal Hsync (FIG. 9(B)), the value of the vertical back porch counter output Vbp_cnt is incremented by one.

Next, when the signal level of the luminance signal Yin becomes the threshold value Vt or higher and the horizontal active signal H_act (FIG. 9(C)) attains "H" level at timings t23 to t24 in one horizontal period from timings t22 to t25, the vertical active signal V_act (FIG. 9(D)) attains "H" level at timing t25 that is the next rising edge of the horizontal synchronizing signal Hsync. Thereby, when the vertical active signal V_act is in "H" level (timings t25 to t28), that is, when the horizontal active signal H_act is in "H" level in one horizontal period, the value of the vertical back porch counter output Vbp_cnt is fixed (fixed to "2" in FIG. 9). At this time, the value of the vertical back porch counter output Vbp_cnt becomes the established value in the vertical period, and is updated and maintained as the vertical back porch length output Vbp_out (FIG. 9).

Next, when the horizontal active signal H_act is fixed at "L" level in one horizontal period of timings t27 to t28, the vertical active signal V_act returns to "L" level at timing t28 as the next rising edge of the horizontal synchronizing signal Hsync, and the value of the vertical back porch counter output Vbp_cnt is again incremented by one. When the vertical synchronizing signal Vsync attains "H" level at timing t29, the measurement of one vertical period is completed.

Such measurement of one vertical period is performed over a unit frame period (in the case that the unit frame period is one vertical period, measurement is performed on only one vertical period). Thereby, the vertical back porch length Vbp corresponding to the minimum value of the number of pixels under the threshold value Vt continuously present from the upper end of the measurement region 64A or 64B is outputted from the measuring section 22 in a short time in the unit frame period.

Figure 10:
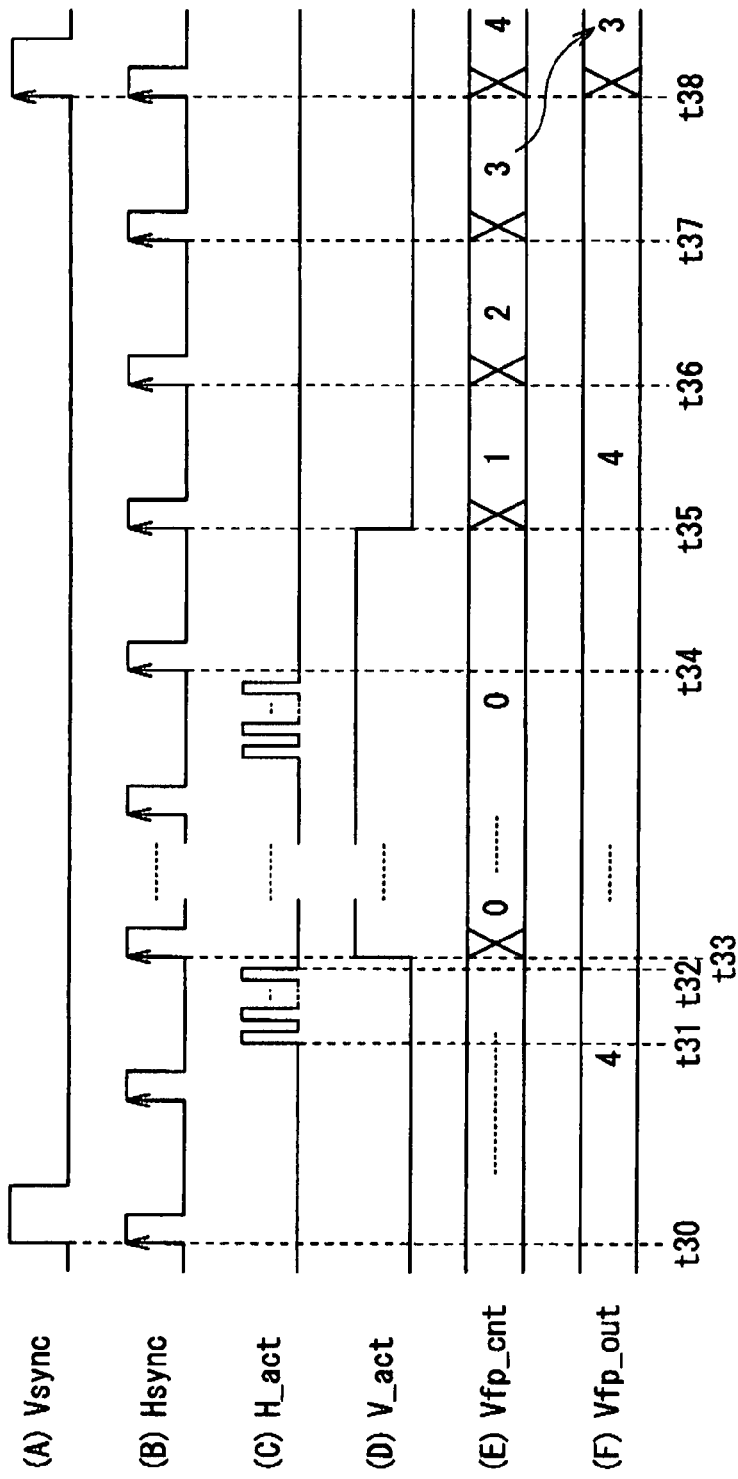
FIG. 10 is a timing chart for explaining a process of measuring a vertical back porch length.

Further, the measurement of the vertical front porch length Vfp shown in FIG. 10 is performed as follows basically in the same manner as in measuring the vertical back porch length Vbp.

First, when the vertical synchronizing signal Vsync (FIG. 10(A)) attains "H" level at timing t30, the signal level of the luminance signal Yin becomes the threshold value Vt or higher and the horizontal active signal H_act (FIG. 10(C)) attains "H" level at timings t31 to t32, the vertical active signal V_act (FIG. 10(D)) attains "H" level at timing t33 as the next rising edge of the horizontal synchronizing signal Hsync (FIG. 10(B)). Thereby, while the vertical active signal V_act is in "H" level (timings t33 to t35), the vertical front porch counter output Vfp_cnt (FIG. 10(E)) is reset, and "0" is outputted.

Next, when the horizontal active signal H_act is fixed to "L" level in one horizontal period from timings t34 to t35, the vertical active signal V_act returns to "L" level at timing t35 as the next rising edge of the horizontal synchronizing signal Hsync. Then, on and after timing t35, (timings t35, t36, and so on), the value of the vertical front porch counter output Vfp_cnt is incremented by 1.

Next, when the vertical synchronizing signal Vsync attains "H" level at timing t38 again, the value of the vertical front porch counter output Vfp_cnt then becomes the established value in the vertical period and is updated and maintained as the vertical front porch length output Vfp_out (FIG. 10(F)). The measurement in one vertical period is completed.

Such measurement in one vertical period is performed over a unit frame period. Thereby, the vertical front porch length Vfp corresponding to the minimum value of the number of pixels under the threshold value Vt continuously present from the lower end of the measurement regions 64A or 64B is outputted from the measuring section 22 in a short time in the unit frame period.

Such measurements of the horizontal back porch length Hbp, the horizontal front porch length Hfp, the vertical back porch length Vbp, and the vertical front porch length Vfp by the measuring section 22 may be made sequentially, or two or more thereof may be made at the same time. In the latter case, measurements of the horizontal back porch length Hbp, the horizontal front porch length Hfp, the vertical back porch length Vbp, and the vertical front porch length Vfp can be all measured in the unit frame period, and thus faster measurements can be made.

Figure 11:
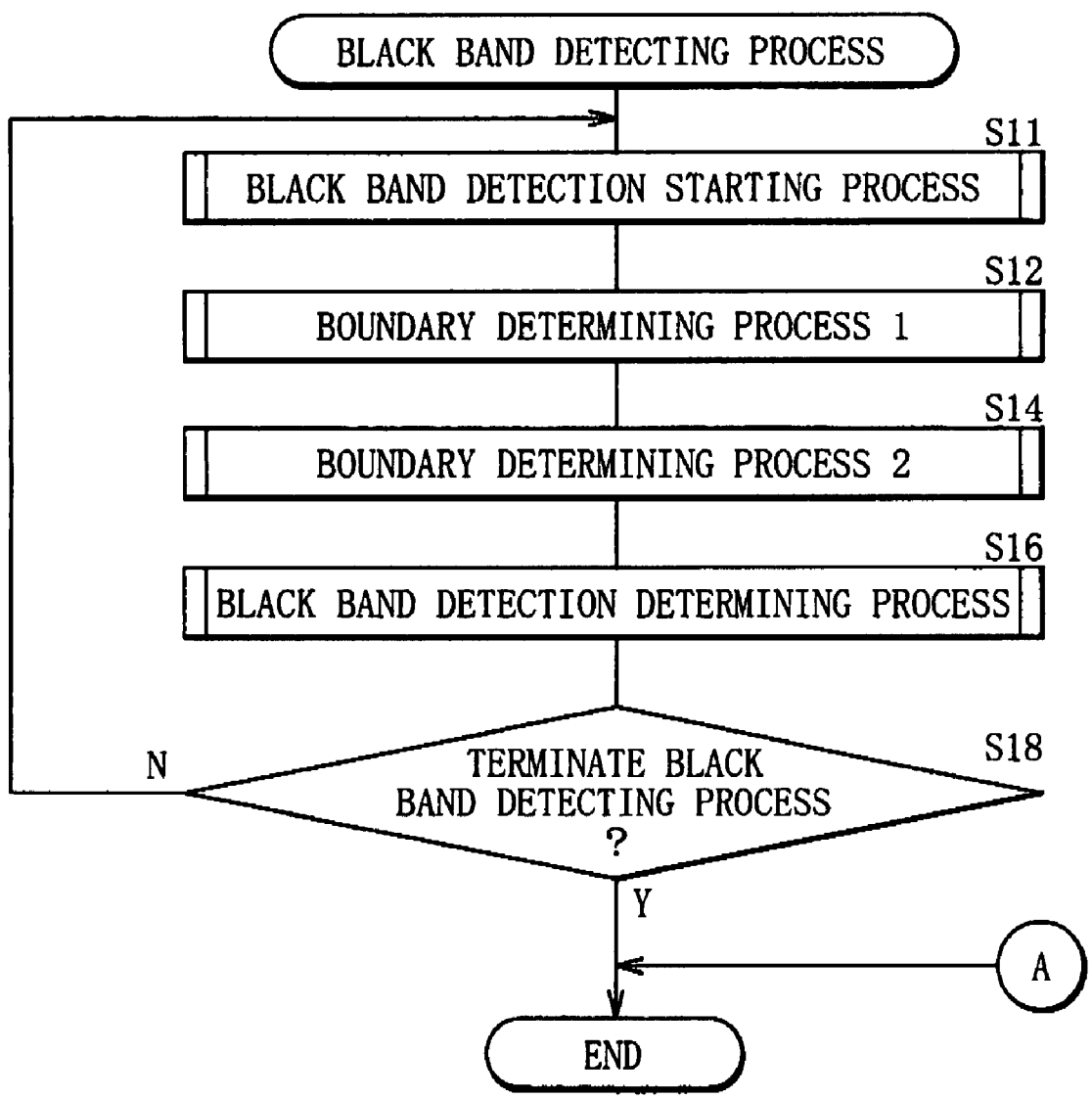
FIG. 11 is a flowchart showing a black band detecting process.
Figure 13A:
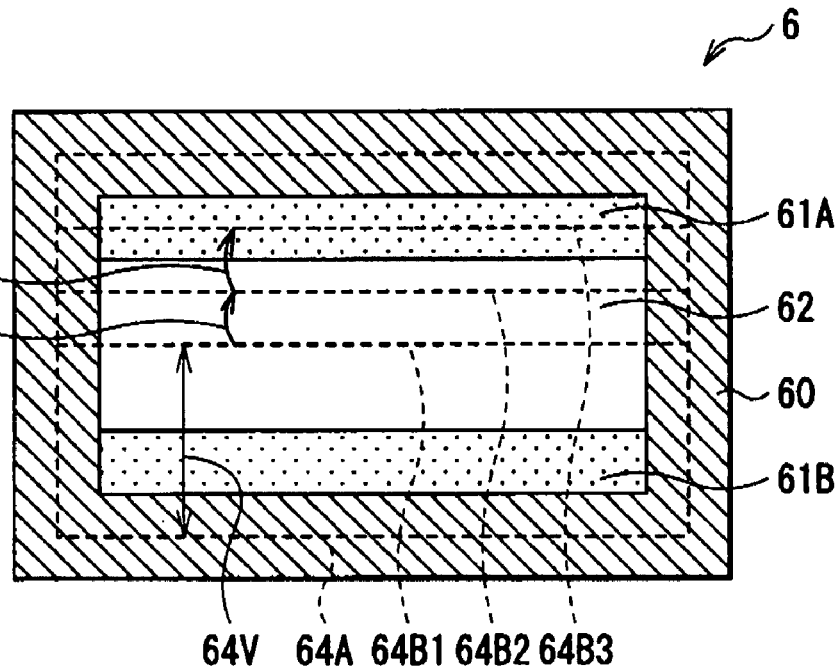
FIGS. 13A and 13B are schematic views for explaining binary search of a black band region in a vertical direction.
Figure 13B:
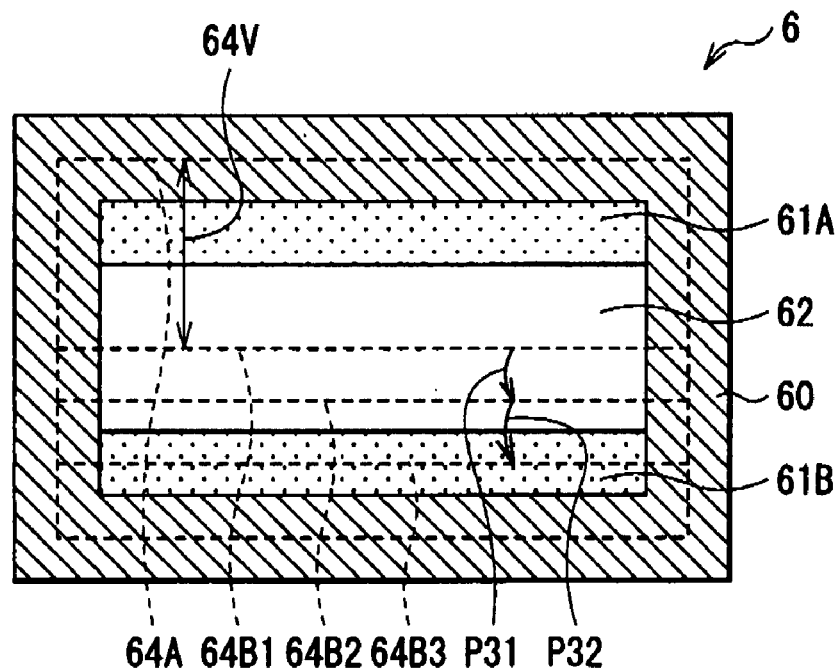
Figure 14A:
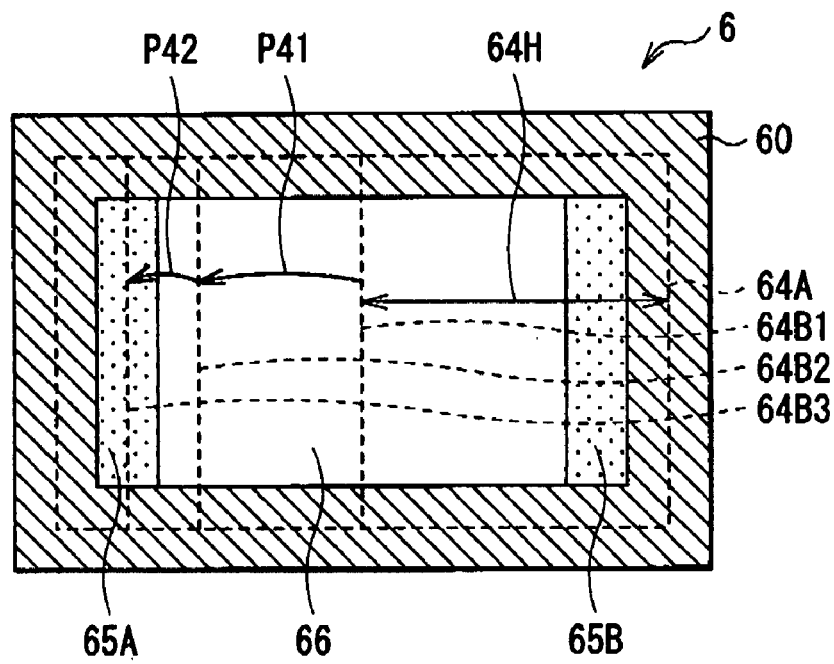
FIGS. 14A and 14B are schematic views for explaining binary search of a black band region in a horizontal direction.
Figure 14B:
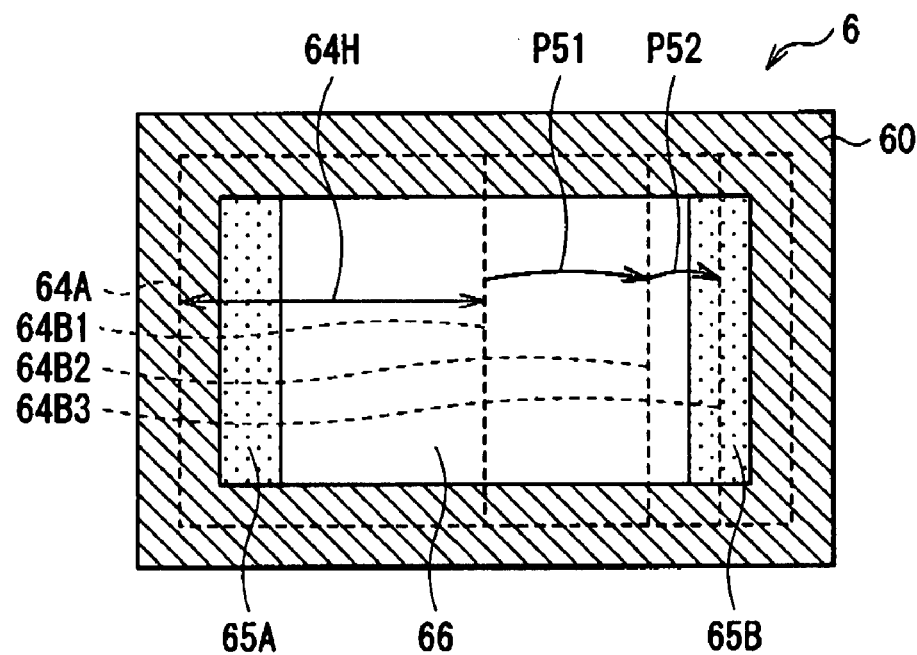

Next, a description will be given of black band detecting process by the black band detecting section 2 as one of the characteristics of the invention with reference to FIG. 11 to FIG. 23. FIG. 11 is a flowchart of the black band detecting process in the black band detecting section 2.

In the black band detecting process, for example, as shown in FIG. 12A, in the case where the black band regions 61A and 61B are arranged above and below the image region 62, and the OSD 63A and the subtitles 63B are included in the black band regions 61A and 61B, the horizontal back porch length H1A and the horizontal front porch length H1B of the input image signal 6, a length V0A from the top end of the input image signal 6 to the top end of the OSD 63A and the vertical length V1A from the top of the input image signal 6 to the bottom of the black band region 61A, a length V0B from the bottom end of the input image signal 62 to the bottom end of the subtitle 63B and the vertical length V1B from the bottom of the input image signal 6 to the top of the black band region 61B, the vertical width V2 of the image region 62 and the like are detected.

Moreover, for example, as shown in FIG. 12B, in the case where the black regions 65A and 65B are arranged on the right and the left of the image region 66, the vertical back porch length V1A and the vertical front porch length V1B of the input image signal 6, the horizontal length H1A from the left end of the input image signal 6 to the right end of the black band region 65A, the horizontal length H1B from the right end of the input image signal 6 to the left end of the black band region 65B, the horizontal width H2 of the image region 62 and the like are detected.

Further, in the black band detecting process, for example, as respectively indicated by the measurement region 64A (basic region), measurement regions 64B1 to 64B3, and arrows P21, P22, P31, P32, P41, P42, P51, P52 in FIGS. 13A, 13B, 14A, and 14B, the black band detection is performed while the increment/decrement value 64V, an increment/decrement value 64H of the measurement region are reset to one half of the previous increment/decrement values. That is, in the black band detecting process, binary search is used. Thereby, though described in details later, fast detection can be made (in the case that the initial increment/decrement value is set to $2^n$, the black band detecting process is completed in the (n+1) unit frame periods at latest, and various parameters shown in FIGS. 12A and 12B are outputted).

In the black band detecting process, a black band detection starting process is firstly performed (step S11).

Figure 15:
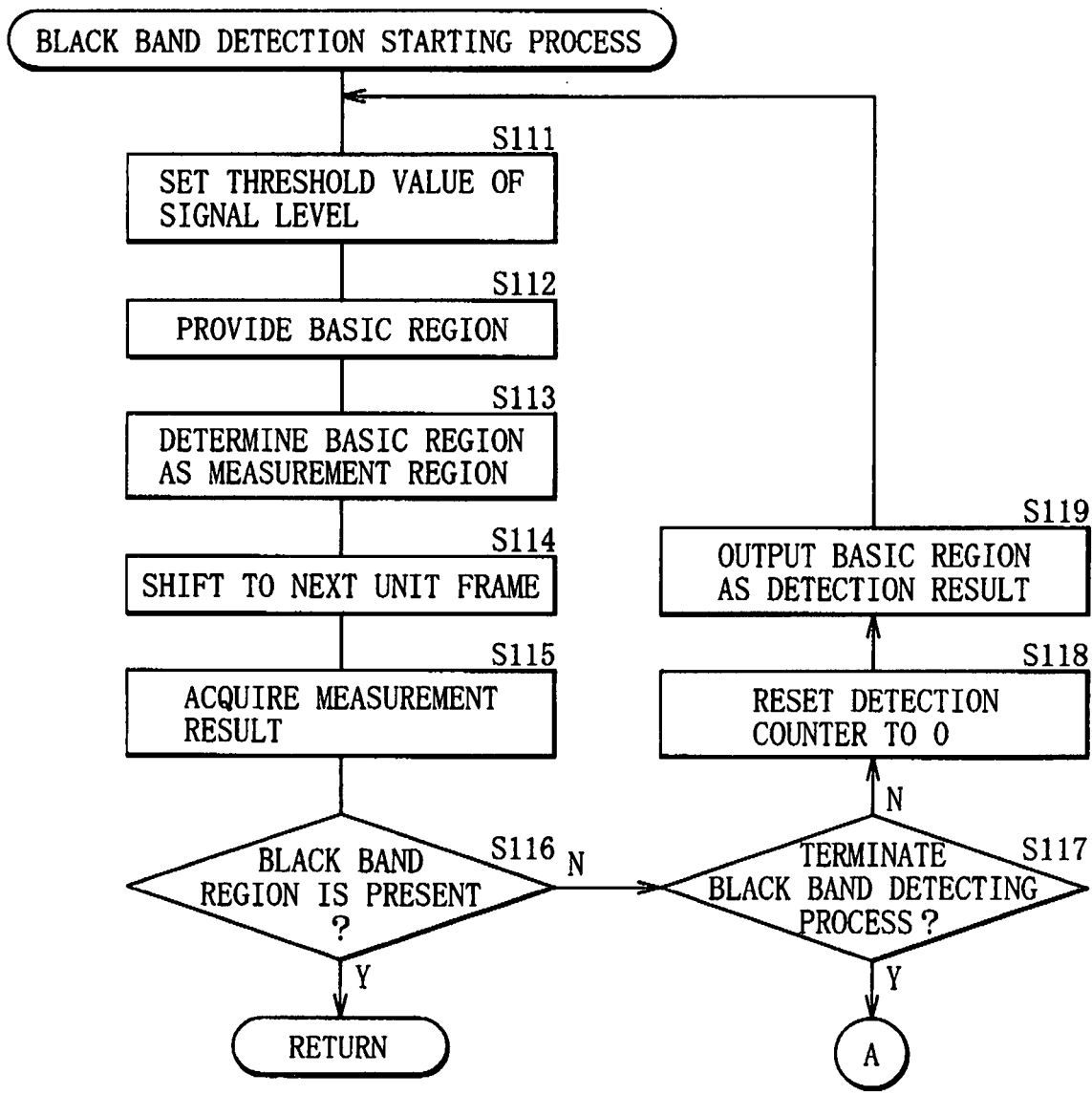
FIG. 15 is a flowchart showing details of black band detection starting process of FIG. 11.

Specifically, as shown in the flowchart of FIG. 15, first, the threshold value setting section 239 sets the threshold value Vt of the signal level, and outputs the threshold value to the signal level comparing section 221 (step S111 of FIG. 15). Next, based on the signal type identifying result Sout, the basic region providing section 231 provides the basic region (step S112). Next, the measurement region determining section 238 determines the basic region to the measurement region 64A, and outputs the measurement region 64A to the signal level comparing section 221 (step S113).

After standby until shifting to the next frame (step S114), the black band determining section 230 acquires the measurement result Mout (measurement results of the horizontal back porch length Hbp, the horizontal front porch length Hfp, the vertical back porch length Vbp, and the vertical front porch length Vfp in the measurement region 64A) from the measuring section 22 (step S115). Then, the black band determining section 230 determines whether the black band region is present in the measurement region 64A based on the measurement result Mout (step S116). When the presence of the black band region is determined (step S116: Y), the procedure is moved into the next boundary determining process 1 (step S12 in FIG. 11).

Meanwhile, when the absence of the black band region is determined in step S116 (step S116: N), determination is made whether the black band detecting process is terminated (step S117). When the termination of the black band detecting process is determined (step S117: Y), the black band detecting process is terminated ("END" in FIG. 11). Meanwhile, when the continuation of the black band detection process is determined (step S117: N), the detection determining section 237 resets the value of the detection number counter that indicates the detection number of the black band region to 0 (step S118). In addition, the detection determining section 237 outputs the basic region 64A as the detection result Kout to the image processing section 3 (step S119). Then, until the presence of the black band region is determined or the termination of the black band detecting process is determined, the processes of steps S111 to S119 are repeated.

Next, the boundary determining process 1 is performed (step S12 in FIG. 11). Specifically, the processes shown in the flowcharts in FIG. 16 and FIG. 17 are performed.

In the boundary determining process 1, by using the before-mentioned binary search method, the boundary position between the black band region 61A on the upper side or the black band region 65A on the left side and the image region 62 or the image region 66 in the input image signal 6 is determined.

Figure 16:
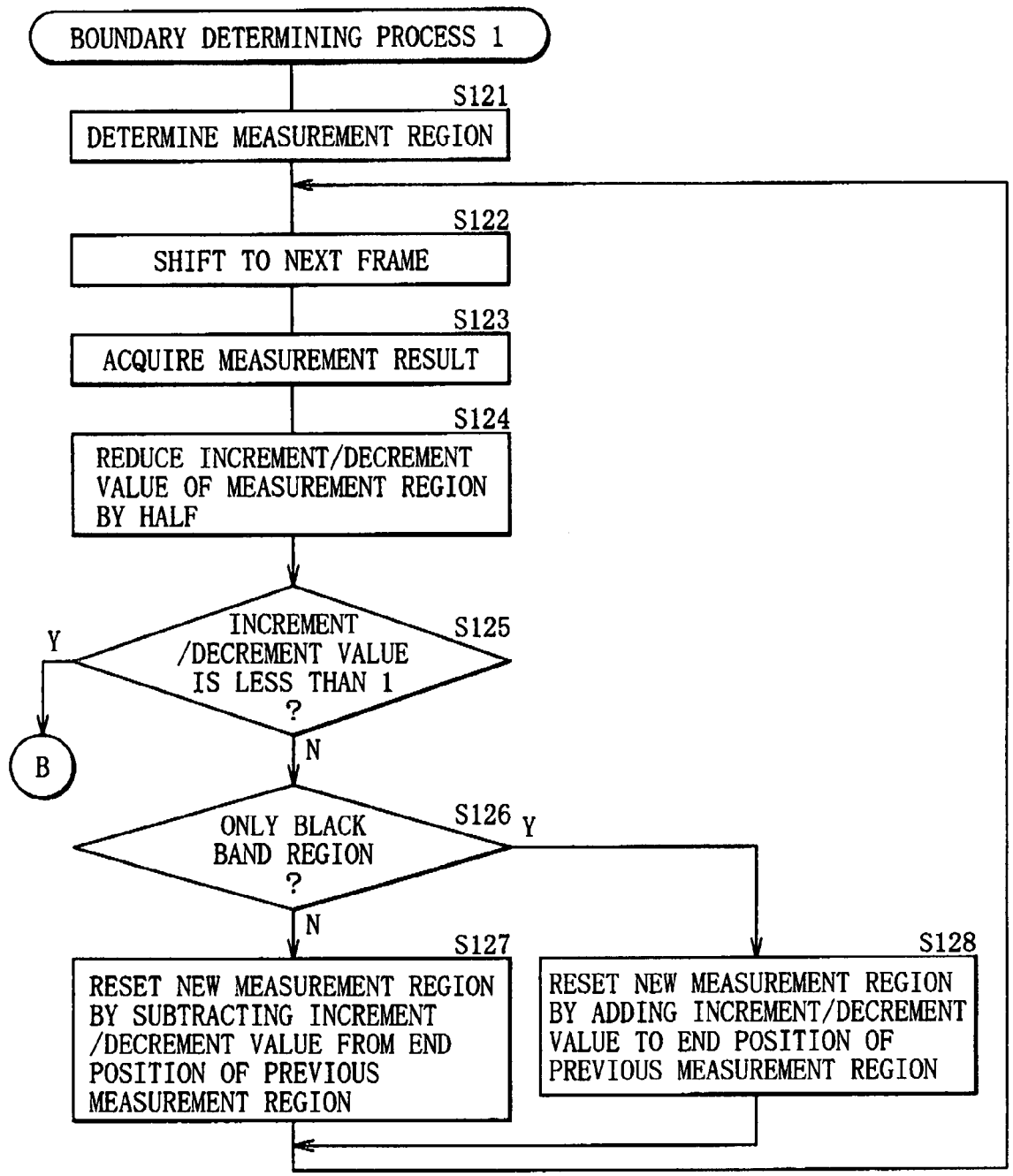
FIG. 16 is a flowchart showing details of a boundary determining process 1 of FIG. 11.
Figure 17:
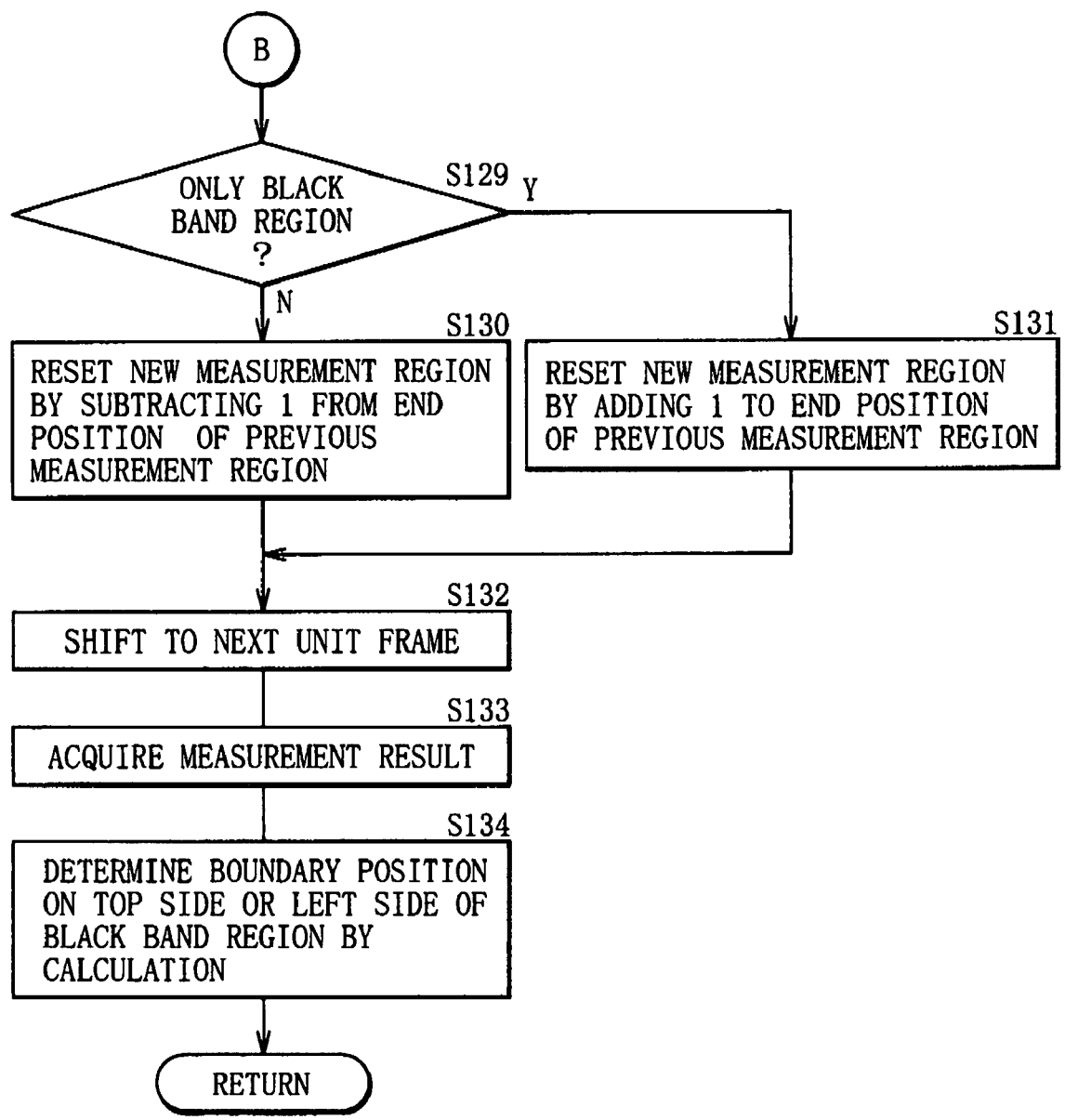
FIG. 17 is a flowchart showing details of the boundary determining process 1 following FIG. 16.

Specifically, first, the measurement region determining section 238 determines a first measurement region, and outputs the first measurement region to the signal level comparing section 221 (step S121 in FIG. 16). More specifically, when determining the boundary position of black band region 61A on the upper side, the start and the end positions in the horizontal direction and the start position in the vertical direction are respectively set to the start and end positions in the horizontal direction and the start position in the vertical direction in the basic region 64A. Meanwhile, in this case, the end position in the vertical direction is set to the position as a result of adding the initial increment/decrement value in the vertical direction set by the initial increment/decrement value setting section 232 to the vertical start position in the basic region 64A. When determining the boundary position of the black band region 65A on the left side, the start and the end positions in the vertical direction and the start position in the horizontal direction are respectively set to the start and end positions in the vertical direction and the start position in the horizontal direction in the basic region 64A. Meanwhile, in this case, the end position in the horizontal direction is set to the position as a result of adding the initial increment/decrement value in the horizontal direction set by the initial increment/decrement value setting section 232 to the horizontal start position in the basic region 64A. The initial increment/decrement values in the horizontal direction and the vertical direction are set based on the signal type identifying result Sout. In addition, in the boundary determining process 1, the boundary position on the upper side or the left side is determined. Therefore, it is desirable to set the initial increment/decrement values in the horizontal direction and the vertical direction to one half or less of the widths in the horizontal direction and the vertical direction of the basic region 64A. Thereby, the boundary position of the black band region can be determined in a shorter time.

Next, after standby until shifting to the next unit frame (step S122), the black band determining section 230 acquires the measurement result Mout from the measuring section 22 (step S123). The increment/decrement value providing section 233 reduces the increment/decrement value of the measurement region by half. That is, the increment/decrement value providing section 233 resets to one half of the increment/decrement value of the previous measurement region as a new increment/decrement value. Next, the increment/decrement value providing section 233 determines whether the new increment/decrement value set above is under 1 (step S125). When the new increment/decrement value is under 1 (step S125: Y), determination is made that it is not necessary to use the binary search method any more and the black band detecting process is moved into the next process (step S129 in FIG. 17).

Meanwhile, when the new increment/decrement value is not under 1 in step S125 (step S125: N), the black band determining section 230 determines whether only the black band region (black band region including the blanking region 60) is present in the measurement region 64B, based on the measurement result Mout (step S126). According to the determination result, the measurement region determining section 238 resets a new measurement region by adding or subtracting the new increment/decrement value of the new measurement region provided by the increment/decrement value providing section 233 in step S124 to or from the previous measurement region (steps S127 and S128).

Figure 18A:
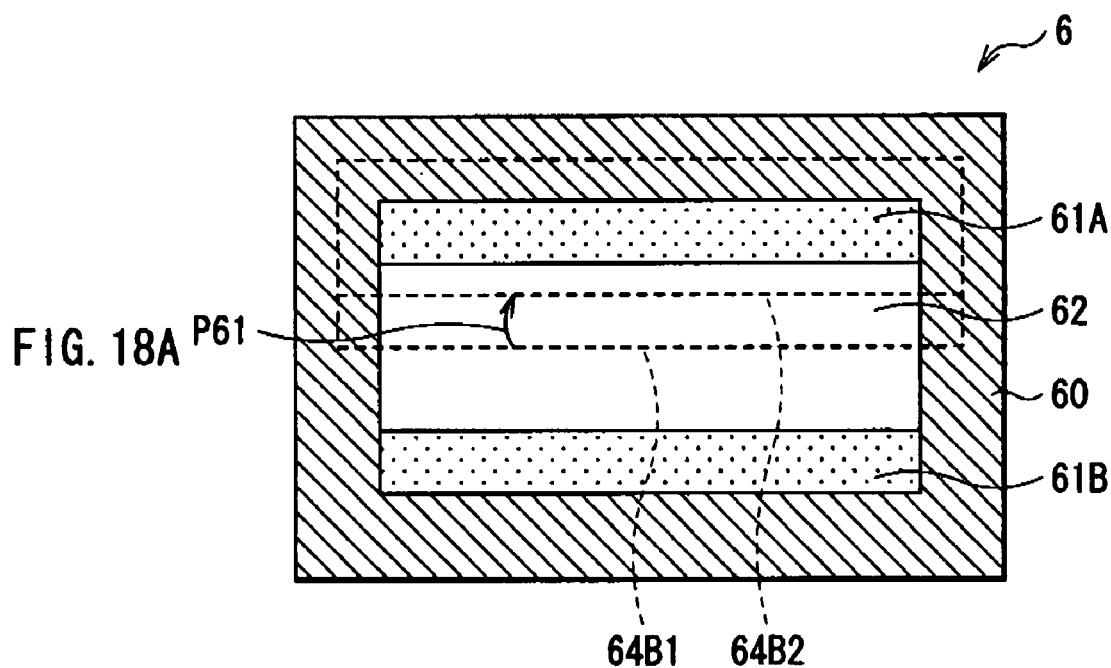
FIGS. 18A and 18B are schematic views for explaining the boundary determining process 1.
Figure 18B:
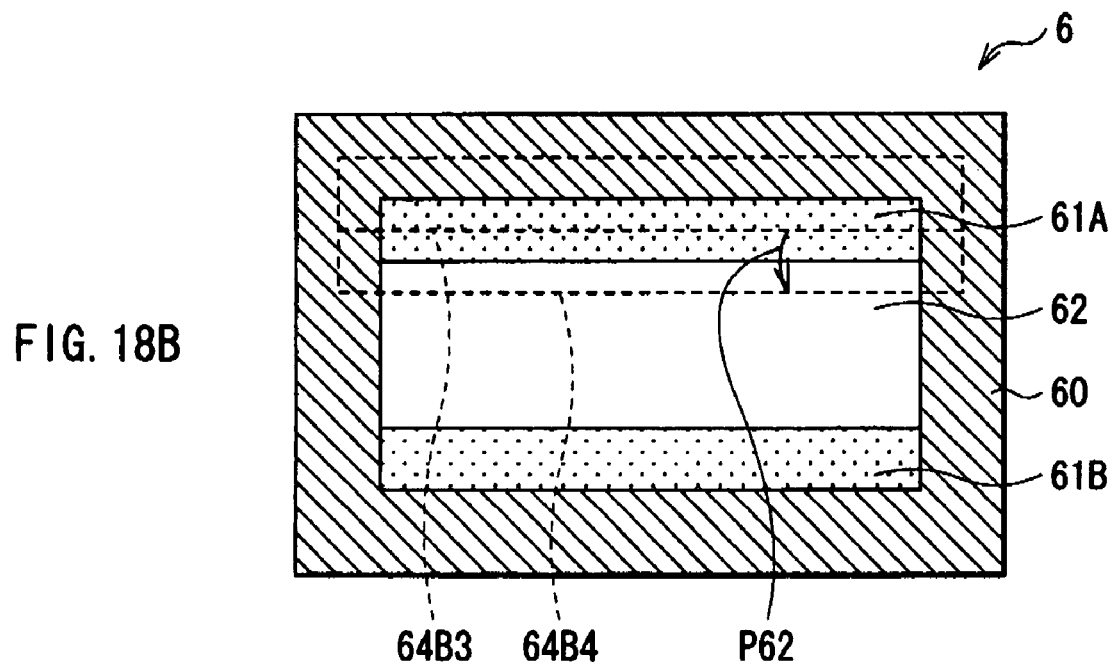

Specifically, for example, as shown in FIG. 18A, when the image region 62 is present in addition to the black band region in the measurement region 64B1 (step S126: N), as indicated by an arrow P61 in the drawing, a new increment/decrement value is subtracted from the end position of the previous measurement region 64B1, and thereby the new measurement region 64B2 is reset (step S127). Meanwhile, for example, as shown in FIG. 18B, when only the black band region is present in the measurement region 64B3 (step S126: Y), as indicated by an arrow P62 in the drawing, a new increment/decrement value is added to the end position of the previous measurement region 64B3, and thereby a new measurement region 64B4 is reset (step S128). On and after steps S127 and S128, the processes of steps S122 to S127 or S128 are repeated until determination is made that the new increment/decrement value is under 1 in step S125, that is, determination is made that the boundary position between the black band region and the image region is detected (step S125: Y). In FIGS. 18A and 18B, the case that the boundary position of the black band region 61A on the upper side is determined is shown. However, in the case that the boundary position of the black band region 65A on the left side is determined, similar processes are performed.

Next, in the same manner as in step S126, the black band determining section 230 determines whether only the black band region is present in the measurement region 64B, based on the measurement result Mout (step S129 in FIG. 17). When it is determined that not only the black band region is present (step S129: N), in the same manner as in step S127, the new increment/decrement value is subtracted from the end position of the previous measurement region, and thereby a new measurement region is reset (step S130). Meanwhile, when it is determined that only the black band region is present (step S129: Y), in the same manner as in step S128, the new increment/decrement value is added to the end position of the previous measurement region, and thereby a new measurement region is reset (step S131).

Next, after standby until shifting to the next unit frame (step S132), the black band determining section 230 acquires the measurement result Mout from the measuring section 22 (step S133). The boundary determining section 234 calculates the boundary position on the upper side or the left side of the black band region (step S134), outputs the boundary position to the detection determining section 237, and thereby the boundary determining process 1 is terminated, and the black band detecting process is moved into the next process.

Next, boundary determining processing 2 is performed (step S14 in FIG. 11). Specifically, the processes shown in the flowcharts in FIG. 19 and FIG. 20 are performed.

In the boundary determining process 2, basically in the same manner as in the foregoing boundary determining process 1, the boundary position between the black band region 61B on the lower side or the black band region 65B on the right side and the image region 62 or the image region 66 in the input image signal 6 is determined.

Figure 19:
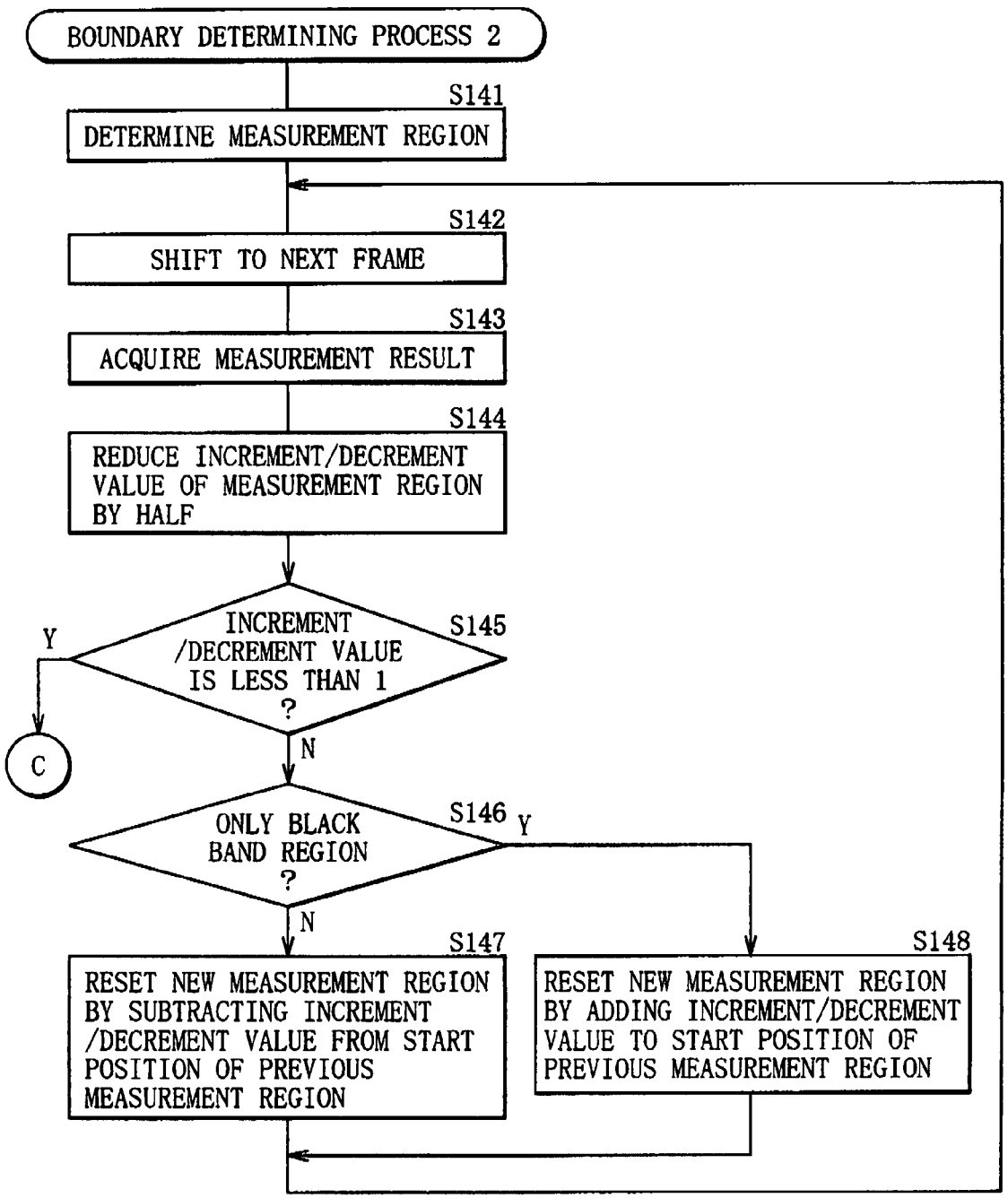
FIG. 19 is a flowchart showing details of a boundary determining process 2 in FIG. 11.
Figure 20:
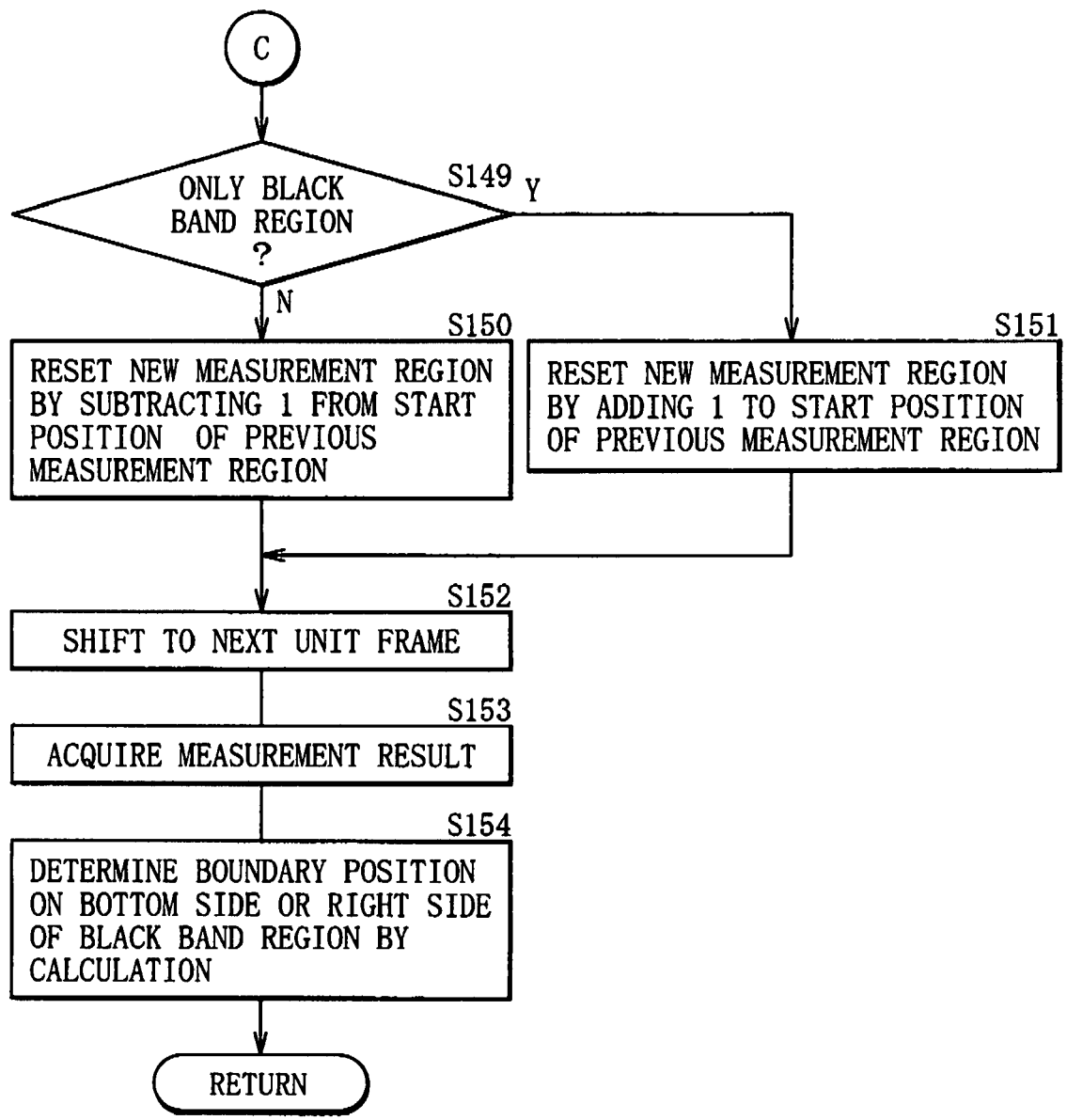
FIG. 20 is a flowchart showing details of the boundary determining process 2 following FIG. 19.

Specifically, first, the measurement region determining section 238 determines a first measurement region and outputs the measurement region to the signal level comparing section 221 (step S141 in FIG. 19). More specifically, when the boundary position of the black band region 61B on the lower side is determined, the start position and the end position in the horizontal direction and the end position in the vertical direction are respectively set to the start position and the end position in the horizontal direction and the end position in the vertical direction in the basic region 64A. Meanwhile, the start position in the vertical direction is set to the position as a result of subtracting the initial increment/decrement value in the vertical direction set by the initial increment/decrement value setting section 232 from the vertical end position of the basic region 64A. Further, when the boundary position of the black band region 65B on the right side is determined, the start position and the end position in the vertical direction and the end position in the horizontal direction are respectively set to the start position and the end position in the vertical direction and the end position in the horizontal direction in the basic region 64A. Meanwhile, the start position in the horizontal direction is set to the position as a result of subtracting the initial increment/decrement value in the horizontal direction set by the initial increment/decrement value setting section 232 from the horizontal end position of the basic region 64A.

Next, in subsequent steps S142 to S153, the processes are performed in the same manner basically as in steps S122 to S133 of the boundary determining process 1. However, in steps S147 and S150, for example, as indicated by an arrow P71 in FIG. 21A, a new increment/decrement value or one is subtracted from the start position of the previous measurement region 64B1, and thereby the new measurement region 64B2 is reset (steps S147 and S150). Further, in steps S148 and S151, for example, as in an arrow P72 in FIG. 21B, the new increment/decrement value or one is added to the start position of the previous measurement region 64B3, and thereby the new measurement region 64B4 is reset (steps S148 and S151).

Figure 21A:
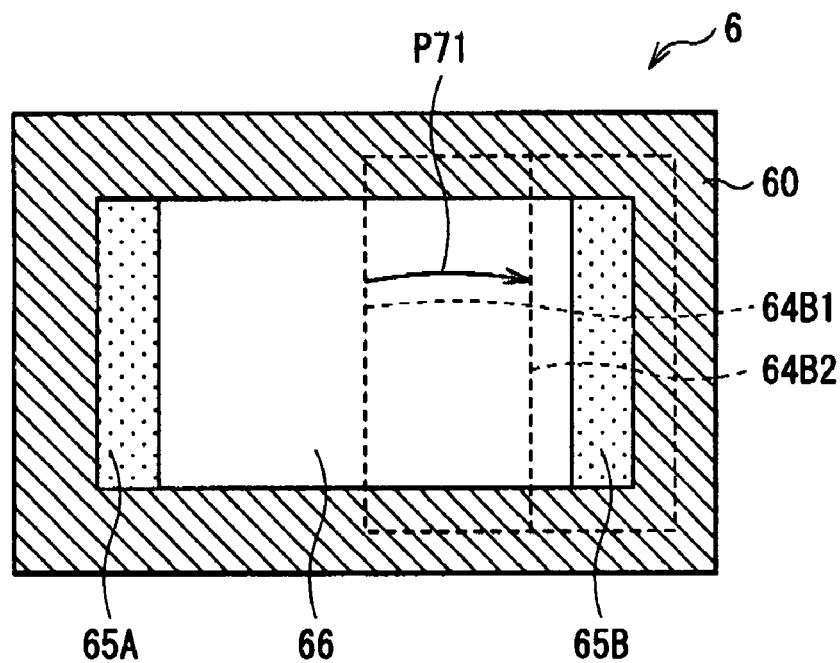
FIGS. 21A and 21B are schematic views for explaining the boundary determining process 2.
Figure 21B:
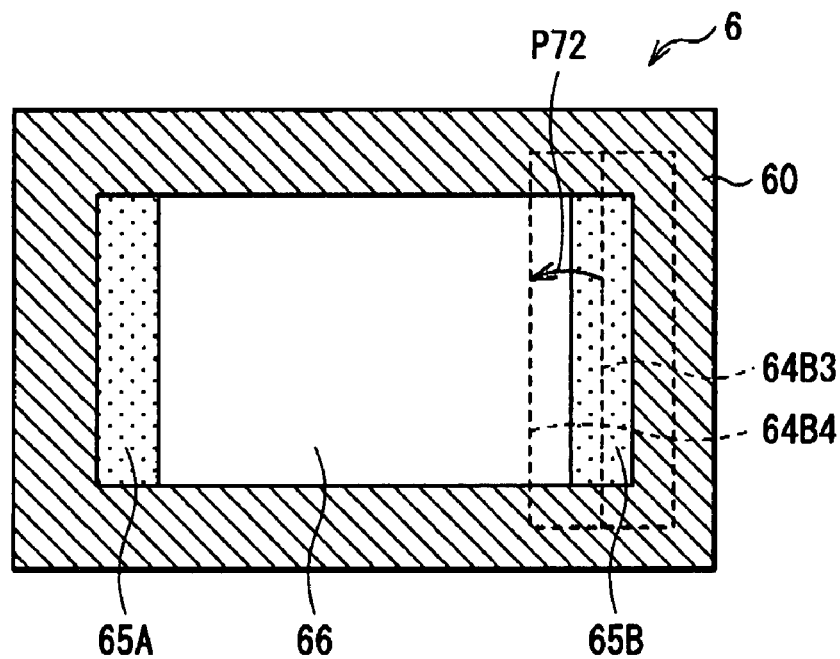

The boundary determining section 234 calculates the boundary positions on the lower side or the right side of the black band region and outputs the calculated boundary positions to the detection determining section 237 in step S154 in FIG. 20. Thereby, the boundary determining process 2 is terminated and the black band detecting process is moved into the next process. FIGS. 21A and 21B show a case that the boundary position of black band region 65B on the right side is determined. However, in the case of the boundary position of the black region 61B on the lower side is determined, similar process is performed.

Next, black band detection determining process is performed (step S16 in FIG. 11). Specifically, the processes shown in the flowcharts in FIGS. 22 and 23 are performed.

Figure 22:
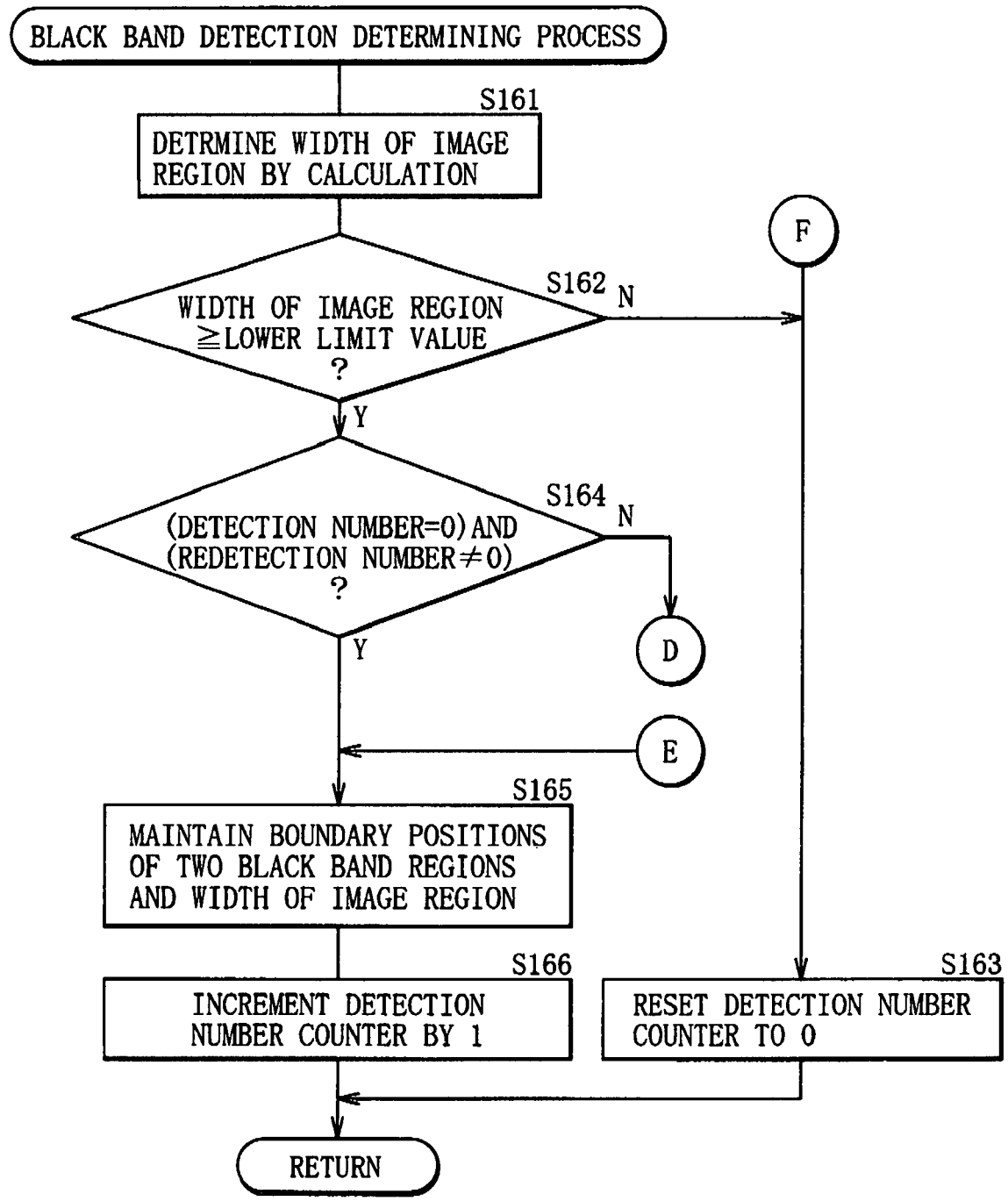
FIG. 22 is a flowchart showing details of a black band detection determining process of FIG. 11.
Figure 23:
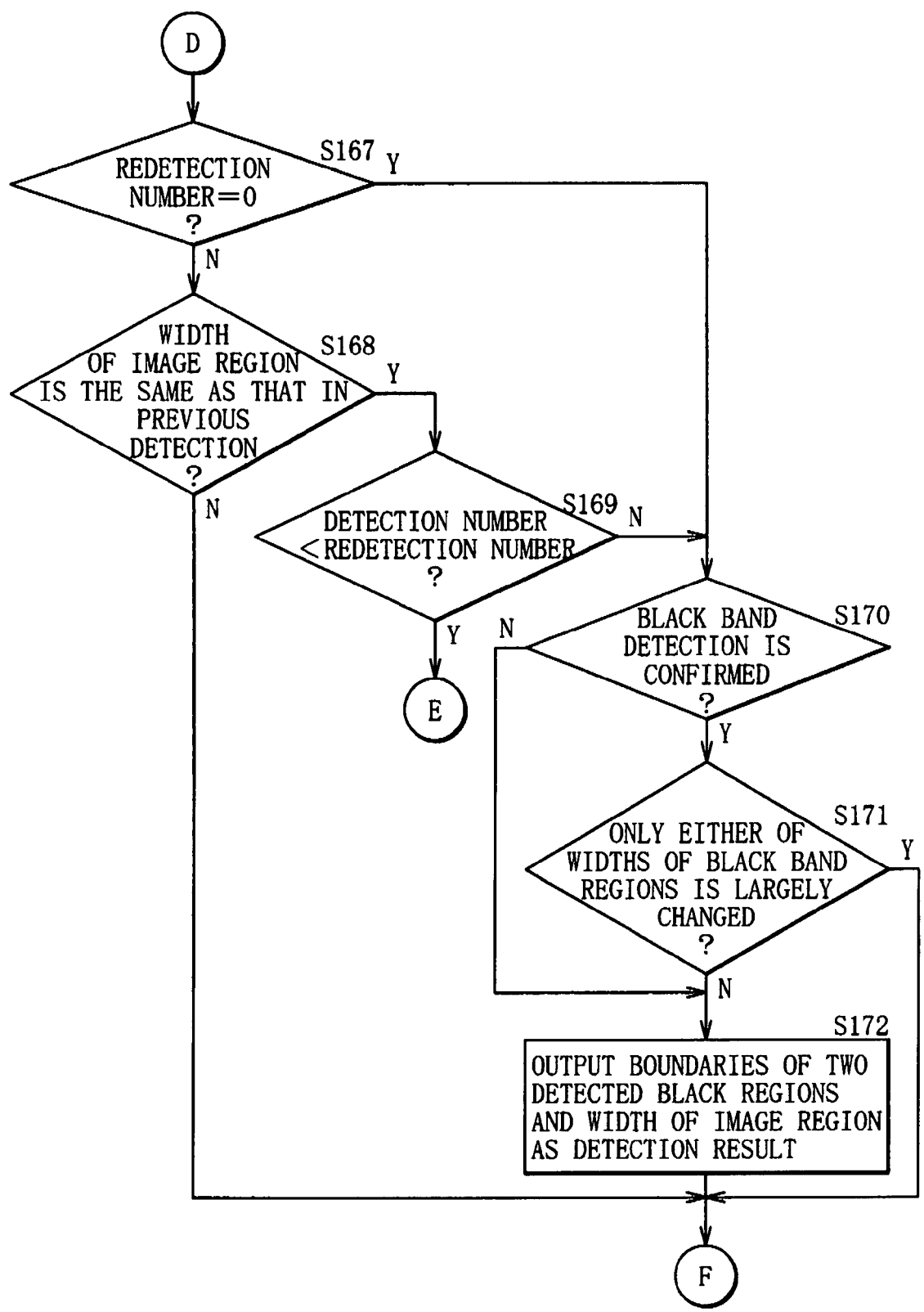
FIG. 23 is a flowchart showing details of the black band detection determining process following FIG. 22.

First, the detection determining section 237 calculates the width of the image region 62 (the vertical width V2 or the horizontal width H2), based on the boundary positions of the black regions 61A and 61B or the black regions 65A and 65B obtained in the boundary determining processes 1 and 2 by the boundary determining section 234, and the resolution of the input image signal 6 obtained by the signal type identifying result Sout (step S161 in FIG. 22). Next, the detection determining section 237 determines whether the width of the image region 62 is equal to or larger than the lower limit value set by the lower limit value setting section 236 (step S162).

When it is determined that the width of the image region 62 is under the lower limit value (step S162: N), determination is made that the image region 62 is a dark scene or the like, and to prevent false detection of the black band region, the value of the detection number counter of the black band region is reset to 0 (step S163). Then, except for the case where the black band detection determining process is terminated ("RETURN"), and the whole black band detecting process is terminated in step S18 in FIG. 11 (step S18: Y), the black band detecting process returns to the black band detection starting process (step S11), and starts from the beginning.

Meanwhile, when it is determined that the width of the image region 62 is equal to or larger than the lower limit value (step S162: Y), the detection determining section 237 determines whether conditional expressions of (value of the detection number counter=0) and (redetection number set by the redetection number setting section 23500) are satisfied (step S164). When it is determined that the foregoing conditional expressions are satisfied (step S164: Y), it is the first black band detection, and thus it is not possible to compare the current detection result to the previous detection result. Therefore, the boundary positions of two detected (upper and lower sides or right and left sides) black band regions and the width of the image region 62 are maintained as it is (step S165), and the value of the detection number counter is incremented by one. Thereby, except for the case where the black band detection determining process is terminated ("RETURN"), and the whole black band detecting process is terminated in step S18 in FIG. 11 (step S18: Y), the black band detecting process returns to the black band detection starting process (step S11), and is performed again.

Meanwhile, when it is determined that the conditional expressions in step S164 are not satisfied (step S164: N), the detection determining section 237 determines whether the redetection number is set to 0 (step S167 in FIG. 23). When determining that the redetection number is set to 0 (step S167: Y), except for the case that the black band detection is already established (step S170: Y), the boundary positions of two detected (upper and lower sides or right and left sides) black band regions and the width of the image region 62 are outputted to the image processing section 3 as it is as the black band detection result Kout (step S172), and the value of the detection number counter of the black band region is reset to 0 (step S163). Thereby, except for the case where the black band detection determining process is terminated, ("RETURN"), and the whole black band detecting process is terminated in step S18 in FIG. 11 (step S18: Y), the black band detecting process returns to the black band detection starting process (step S11), and is performed again.

When it is determined that the black band detection is already established in step S170 (step S170: Y), the detection determining section 237 determines whether the width of the black band region is changed. When it is changed, the detection determining section 237 determines whether only one of widths of two black band detection regions is largely changed (step S171). When only one thereof is largely changed (step S171: Y), the detection determining section 237 determines that the image region 62 is a dark scene or the like, and to prevent false detection of the black band region, the value of the detection number counter of the black band region is reset to 0 (step S163). Thereby, the black band detection result Kout is not outputted, and the black band detection determining process is terminated ("RETURN"). Meanwhile, when it is determined that not only one thereof is largely changed (step S171: N), the process moves into step S172, the black band detection result Kout is outputted (step S172), and the value of the detection number counter of the black band region is set to 0 (step S163). Thereby, the black band detection determining process is terminated ("RETURN").

When it is determined that the redetection number is set to a value other than 0 (value of 1 or more) in step S167 (step S167: N), it means that the detection number of the black band region is 1 or more. Therefore, the detection determining section 237 determines whether the width of the image region 62 in the previous detection corresponds to that in the current detection (step S168). If not (step S168: N), there is a high possibility of false detection. To prevent such a false detection, the value of the detection number counter of the black band region is reset to 0 (step S163). Thereby, the black band detection result Kout is not outputted, and the black band detection determining process is terminated ("RETURN"). Meanwhile, when it is determined that the width of the image region 62 in the previous detection corresponds to that in the current detection (step S168: Y), the detection determining section 237 determines whether the value of the detection number counter is under the set redetection number (step S169). When it is determined that the value of the detection number counter is under the set redetection number (step S169: Y), the boundary positions of two detected black band regions and the width of the image region 62 are maintained as it is (step S165), and the value of the detection number counter is incremented by one. Thereby, the black band detection determining process is terminated, ("RETURN"), and except for the case where the whole black band detecting process is terminated in step S18 in FIG. 11 (step S18: Y), the black band detecting process returns to the black band detection starting process (step S11), and is performed again.

Meanwhile, when it is determined that the value of the detection number counter is not under the set redetection number (equal to the redetection number) in step S169 (step S169: N), the process moves into steps S170 to S172, and as described above, the black band detection result Kout is outputted and determination is made whether the black band detection determining process is terminated.

When the black band detection determining process is terminated as above, determination is made whether the whole black band detecting process is terminated in step S18. When the whole black band detecting process is not terminated (step S18: N), the processes of steps S11 to S16 are repeated. When the whole black band detecting process is terminated (step S18: Y), the whole black band detecting process is terminated.

Figure 24:
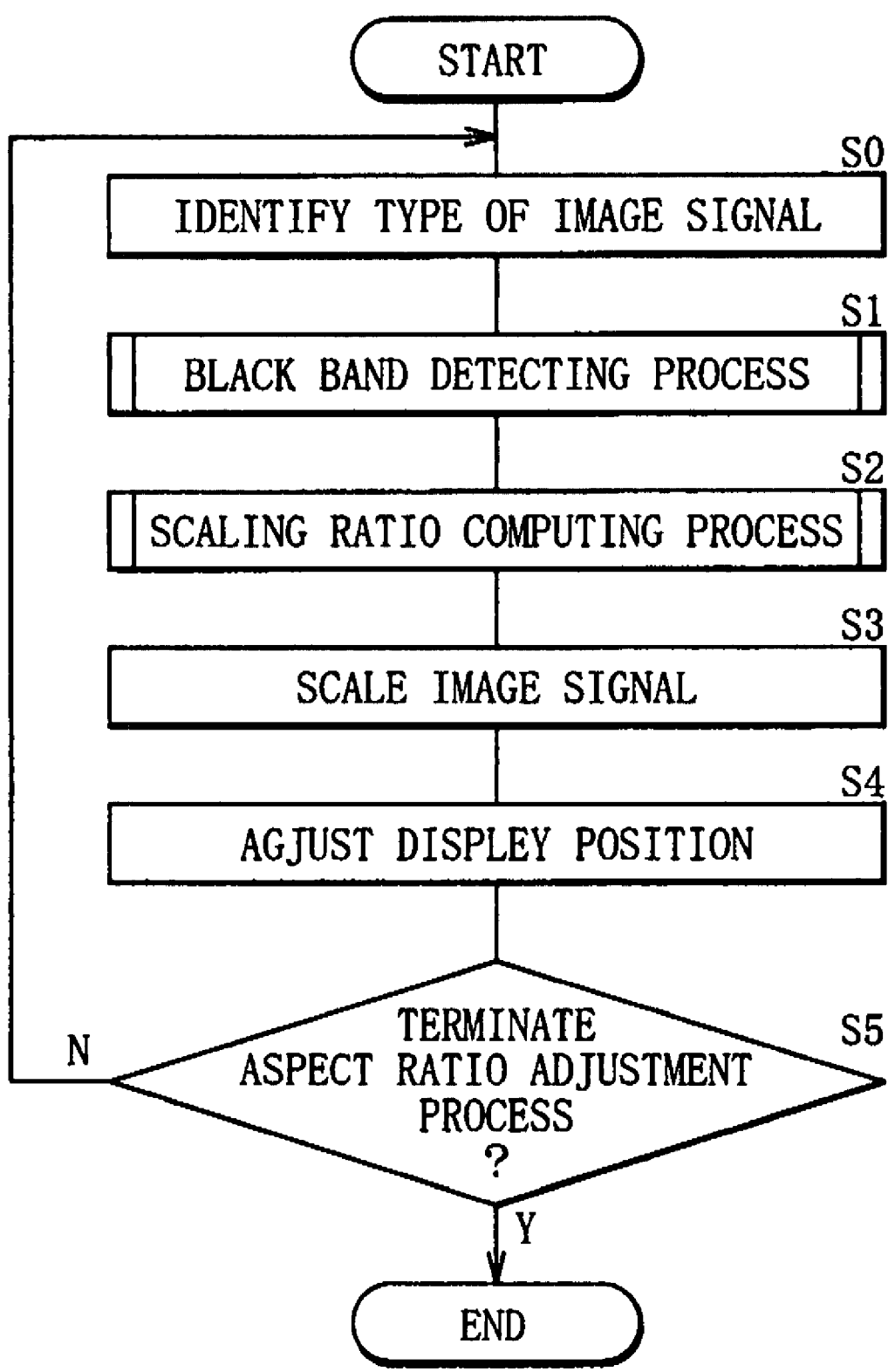
FIG. 24 is a flowchart showing an aspect ratio adjustment process on an input image signal.

Next, a description will be described in detail of the aspect ratio adjustment process of the input image signal in the black band detecting section 2 and the image processing section 3 included in the foregoing black band detecting process, which is one of the characteristics of the invention, with reference to FIG. 24 to FIG. 28. FIG. 24 is a flowchart of the aspect adjustment process.

First, the signal type identifying section 221 in the black band detecting section 2 identifies the type of the input image signal 6 (step S0), and outputs the identifying result Sout to the detecting section 23 and the computing section 31 in the image processing section 3.

Next, based on the signal type identifying result Sout and the luminance signal Yin of the input image signals, the black band detecting section 2 performs the series of black band detecting processes S11 to S18 shown in FIG. 11 (and FIG. 12A to FIG. 23) (step S1), and outputs the black band detection result Kout to the computing section 31.

Figure 25A:
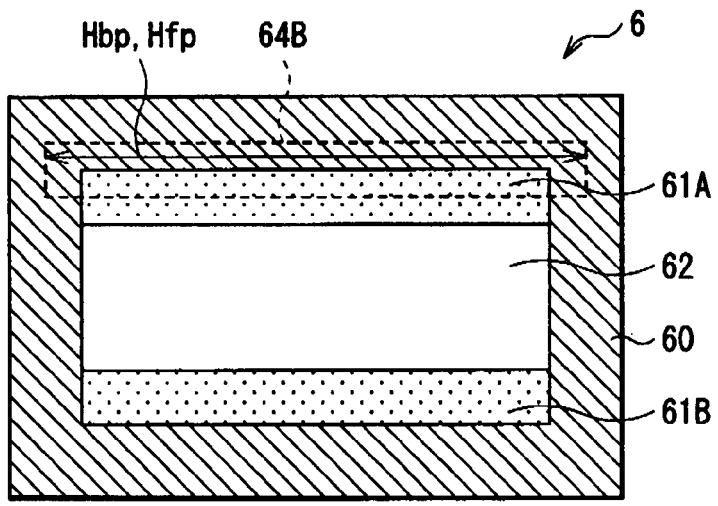
FIGS. 25A to 25C are schematic views for explaining a process of determining whether only a black band is present in a measurement region.
Figure 25B:
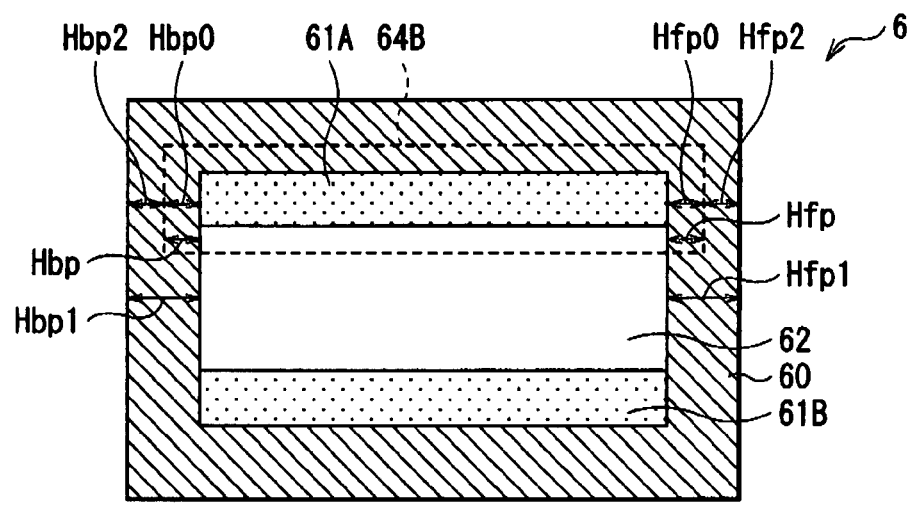
Figure 25C:
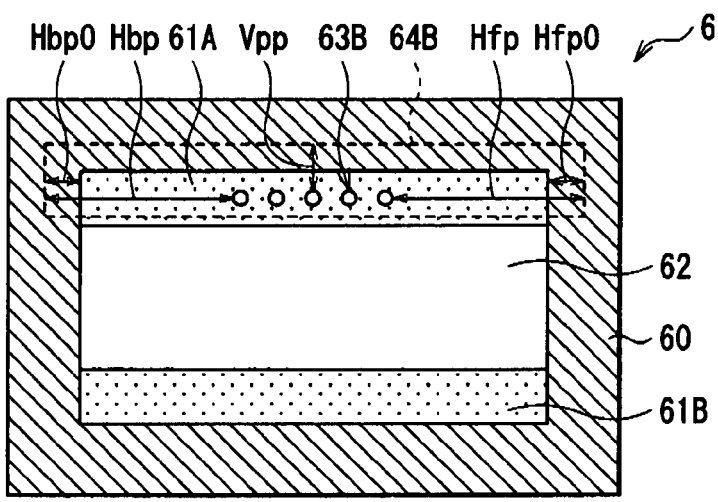

Then, in the black band detecting process S1, in determining whether only the black band region including the blanking region 60 is present in the measurement region 64B in steps S126, S129, S146 and S149 in the boundary determining processes 1 and 2 shown in FIGS. 16, 17, 19, and 20, for example, determination is made as shown FIGS. 25A to 25C. That is, for example, as shown in FIGS. 25A to 25C, in determining whether only the black band region 61A (including the blanking region 60) is present on the upper side of the image region 62, determination is made by using the horizontal back porch length Hbp and the horizontal front porch length Hfp as well.

Specifically, for example, as shown in FIG. 25A, when both the horizontal back porch length Hbp and the horizontal front porch length Hfp correspond to the width in the horizontal direction of the measurement region 64B (in this case, width in the horizontal direction of the basic region 64A), determination is made that the image region 62, the subtitles or the like in the black band region are not present, and only the black band region is present in the measurement region 64B.

Further, for example, as shown in FIG. 25B, when the image region 62 is present in the measurement region 64B, the presence or absence of the image region 62 is determined, according to whether the horizontal back porch length Hbp and the horizontal front porch length Hfp as a result of the measurement correspond to the preset horizontal back porch length Hbp0 and the preset horizontal front porch length Hfp0. Specifically, at least one of a combination of the horizontal back porch length Hbp and the horizontal back porch length Hbp0 or a combination of the horizontal front porch length Hfp and the horizontal front porch length Hfp0 is identical to each other, determination is made that the image region 62 is present. As shown in FIG. 25B, the horizontal back porch length Hbp0 is determined by the difference between the horizontal length Hbp1 determined by the type of the input image signal and the horizontal length Hbp2 determined when the measurement region 64B is set (Hbp0=Hbp1−Hbp2). The horizontal front porch length Hfp0 is determined by the difference between the horizontal length Hfp1 determined by the type of the input image signal and the horizontal length Hfp2 determined when the measurement region 64B is set (Hfp0=Hfp1−Hfp2).

Further, for example, as shown in FIG. 25C, when the image region 62 is not present in the measurement region 64B (only the black band region 61A is present) and the subtitles 63B are present in the black band region 61A, the horizontal back porch length Hbp and the horizontal front porch length Hfp as a result of the measurement are larger than the preset horizontal back porch length Hbp0 and the preset horizontal front porch length Hfp0. Therefore, in this case, first, determination is made that the image region 62 is not present basically. The reason thereof is as follows. That is, if determination is made that the image region including the region of the subtitles 63B is present, wrong adjustment will be made in the after-mentioned aspect ratio adjustment. However, to prevent loss of the subtitles 63B, in addition to the horizontal back porch length Hbp and the horizontal front porch length Hfp as a result of the measurement, the vertical back porch length Vbp and the vertical front porch length Vfp as a result of the measurement are used (in the case of FIG. 25C, the vertical back porch length Vbp is used), and thus the position of the subtitles 63B are easily obtained. The subtitles 63B may be displayed or not displayed according to each unit frame. Therefore, the smallest value of the vertical back porch length vbp or the vertical front porch length Vfp until the detection is established by the black band detecting process is set to the positions of the subtitles 63B.

As above, in determining whether only the black band region including the blanking region 60 is present in the measurement region 64B, determination is made by using the values of the horizontal back porch length Hbp and the horizontal front porch length Hfp as well. Therefore, not only the image region 62 but also the presence of the subtitles 63B in the black band region can be determined.

Figure 26:
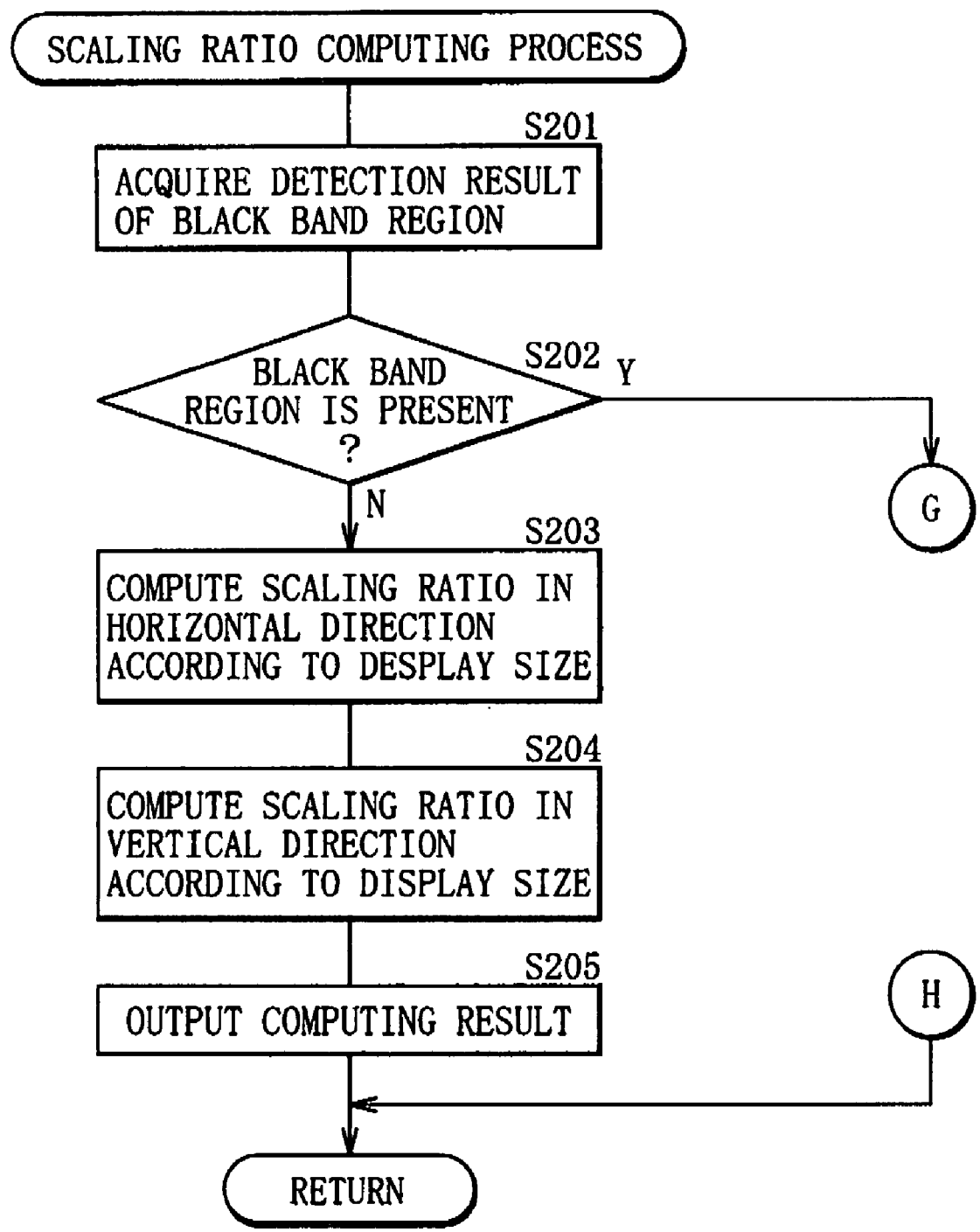
FIG. 26 is a flowchart showing details of scaling ratio computing process in FIG. 24.
Figure 27:
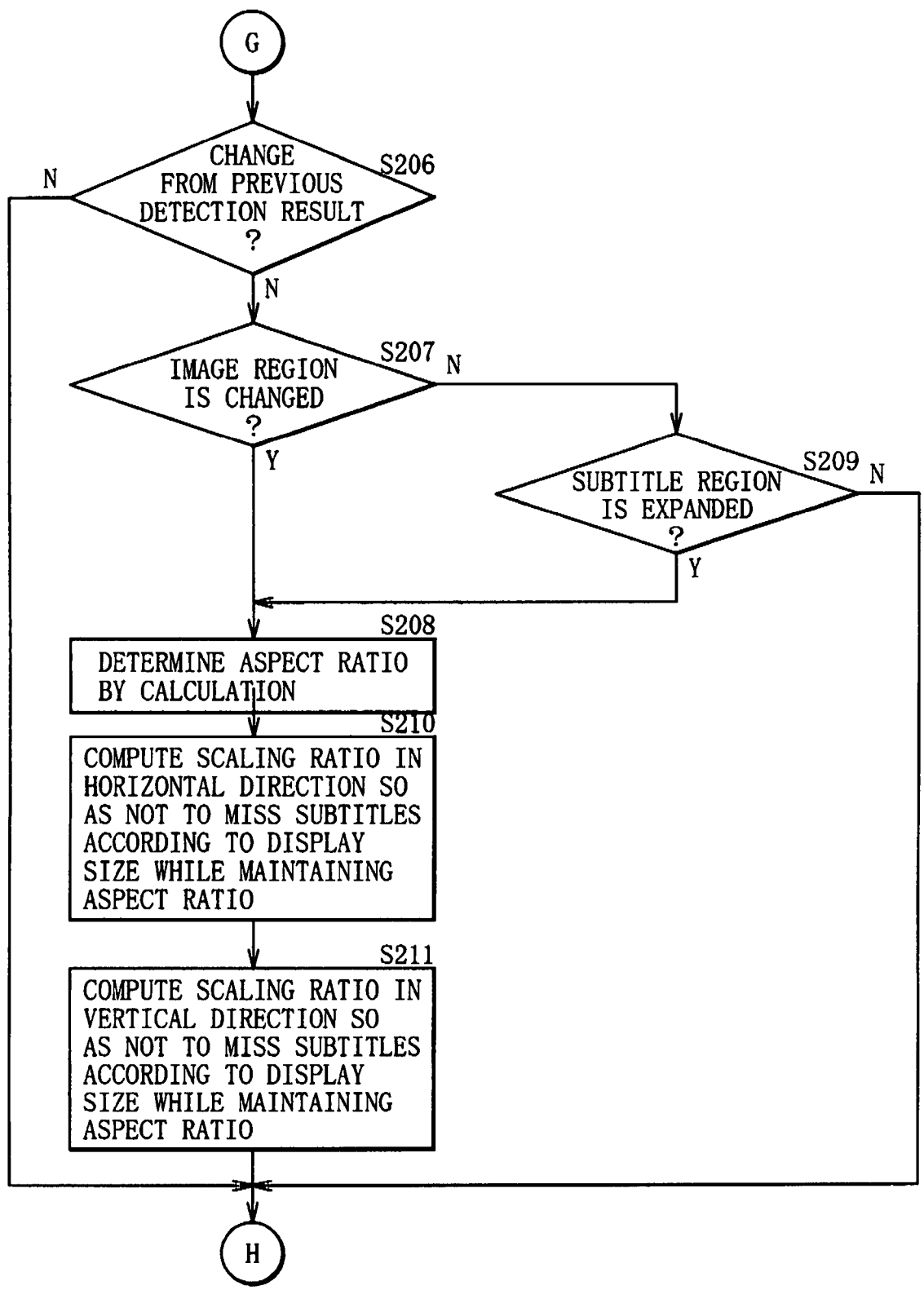
FIG. 27 is a flowchart showing details of the scaling ratio computing process following FIG. 26.

The description will be given with reference to FIG. 24 again. Next, the computing section 31 in the image processing section 3 performs a process (a scaling ratio computing process) for calculating the expansion ratio or the reduction ratio of the YUV signals (Yin, Uin, Vin) as the input image signal, based on the foregoing result of the black band detecting process by the black band detecting section 2 (black band detection result Kout) and the type identifying result Sout of the input image signals by the signal type identifying section 21 (step S2). Specifically, the processes shown in the flowcharts of FIG. 26 and FIG. 27 are performed.

Figure 28:
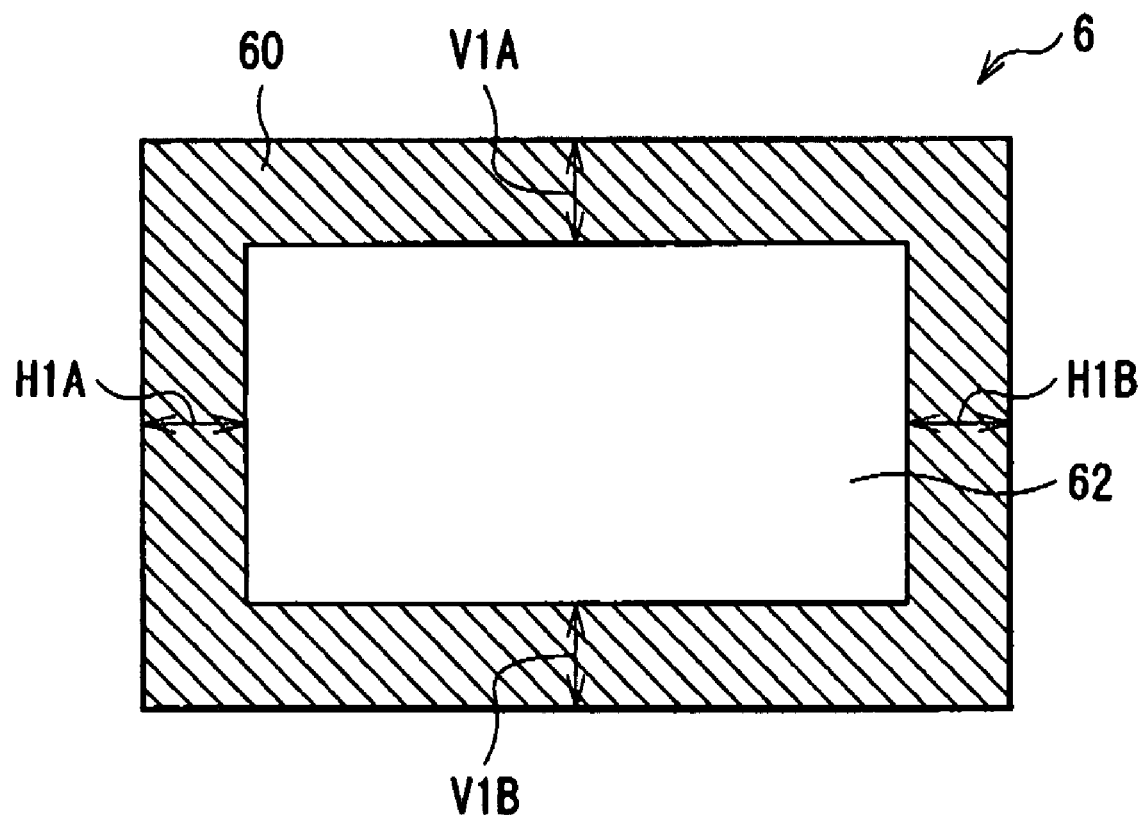
FIG. 28 is a schematic view for explaining a measurement result when no black band region is present.

First, when the computing section 31 acquires the black band detection result Kout (and type identifying result Sout) (step S201), determination is made whether the black band region is present in the input image signals (Yin, Uin, Vin) based on these results (step S202). Specifically, determination is made whether the black band region is present according to whether the horizontal back porch length, the horizontal front porch length, the vertical back porch length, and the vertical front porch length of the input image signals based on the type identifying result Sout respectively correspond to the horizontal back porch length H1A, the horizontal front porch length H1B, the vertical back porch length V1A, and the vertical front porch length V1B based on the black band detection result Kout. For example, when the black band region is not present in the input image signals, for example, as shown in FIG. 28, the foregoing values based on the type identifying result Sout correspond to the values based on the black band detection result Kout.

When determination is made that the black band region is not present in step S202 (step S202: N), the computing section 31 computes the scaling ratios in the horizontal direction and in the vertical direction according to the display size of the image region, based on the signal type identifying result Sout (steps S204 and S205). Then, the computing section 31 outputs the computing result Cout to the scaling section 32 (step S205) Thereby, the scaling ratio computing process is terminated.

Meanwhile, when determination is made that the black band region is present in step S202 (step S202: Y), the computing section 31 determines whether the current black band detection result Kout is changed from the result in the previous unit frame (whether the values of the horizontal back porch length H1A, the horizontal front porch length H1B, the vertical back porch length V1A, the vertical front porch length V1B and the like are changed) (step S206). When determining that there is no change from the previous result (step S206: N), the scaling ratio is not necessarily changed and may be maintained as it is. Thus, the scaling ratio computing process is terminated.

Meanwhile, when determining that there is a change from the previous result in step S206 (step S206: Y), the computing section 31 determines whether there is a change in the image region (for example, whether the widths H1 and V2 of the image region shown in FIGS. 12A and 12B are changed) based on the black band detection result Kout (step S207). When determining that there is no change in the image region (step S207: N), the computing section 31 determines whether the subtitle region is expanded, based on the black band detection result Kout (step S209). Specifically, the computing section 31 determines whether the length V0A to the uppermost end of the OSD 63A including the vertical back porch or the length V0B to the lowermost end of the subtitle 63B including the vertical front porch of the input image signal 6 as shown in FIG. 12A described above are reduced. When determining that the subtitle region is reduced or not changed by these values (step S209: N), the scaling ratio is not necessarily changed and may be maintained as it is. Thus, the scaling ratio computing process is terminated.

Meanwhile, when determining that there is a change in the image region in step S207 (step S207: Y), and when determining that the subtitle region is expanded in step S209 (step S209: Y), the computing section 31 determines the aspect ratio of the image region that is the remaining region after excluding the black band region of the input image signals (Yin, Uin, Vin), based on the black band detection result Kout (specifically, the widths H2 and V2 of the image region and the like) (step S208). Then, the computing section 31 determines the scaling ratios in the horizontal direction and in the vertical direction so that loss of the subtitles can be prevented according to the display size while maintaining the aspect ratio of the image region in the input image signals (Yin, Uin, Vin) based on the determined aspect ratio and the black band detection result Kout (steps S210 and S211). Thereby, the scaling ratio computing process is terminated.

Figure 29A:
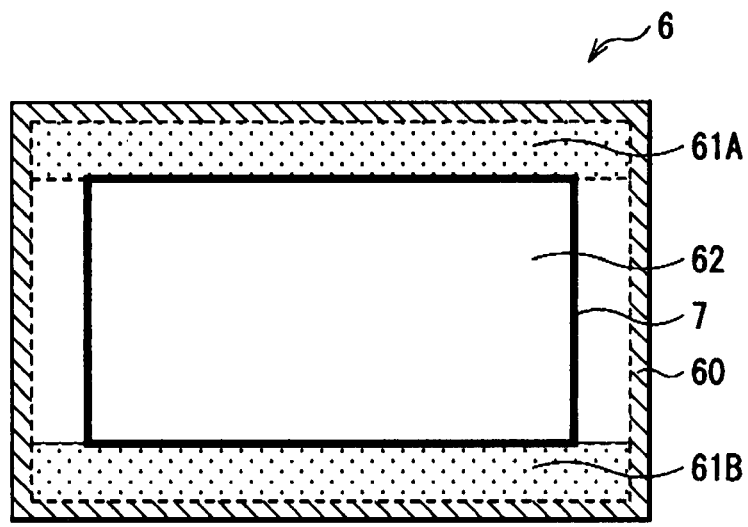
FIGS. 29A to 29C are schematic views for explaining an input image signal scaling process.

Specifically, for example, as shown in FIG. 29A, when there are no subtitles in the black band region 61A and 61B in the input image signal 6, scaling (aspect ratio adjustment) for the input image signal 6 is performed so that only the image region 62 becomes a display region 7 that is to be displayed on the whole display screen of the display section 5 while the aspect ratio of the input image signal 6 is maintained, in order to prevent the black band regions 61A and 61B from blocking views.

Figure 29B:
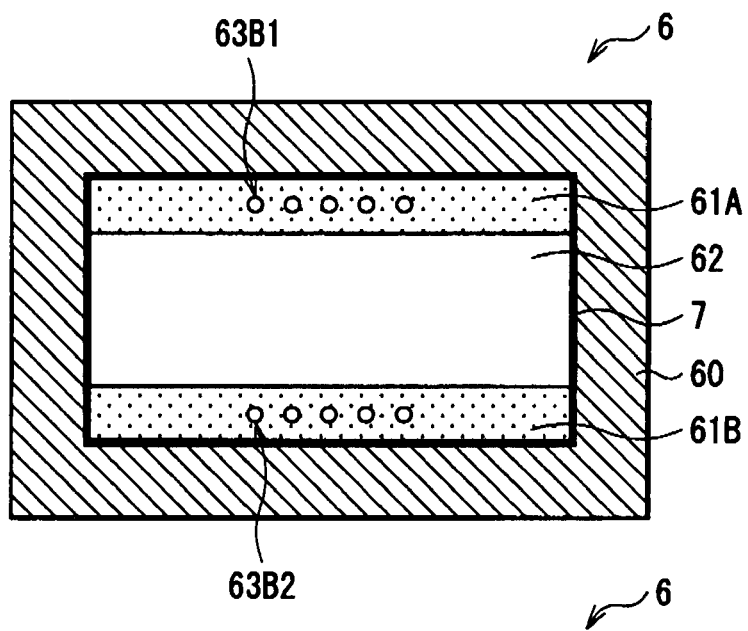
Figure 29C:
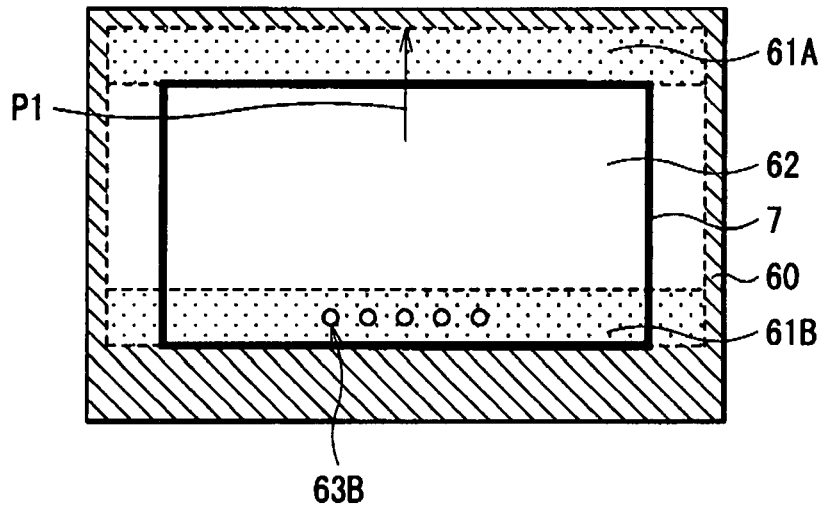

Meanwhile, for example, as shown in FIG. 29B, when there are subtitles 63B1 and 63B2 respectively in the black band regions 61A and 61B, scaling is performed while the aspect ratio of the input image signal 6 is maintained, so that loss of the subtitles 63B1 and 63B2 is prevented. Further, for example, as shown in FIG. 29C, when one of a pair of black band regions (in this case, the black band region 61B on the lower side of the black band regions 61A and 61B on the upper and lower sides) has subtitles (subtitles 63B), the position adjusting section 33 adjusts the position as indicated by an arrow P1 so that the other black band region (in this case, the black band region 61A on the upper side) is not included in the display region 7, for the image signal scaled by the scaling section 32 to prevent loss of the subtitles 63B.

When a sub window is provided in part of the display screen of the display section 5 and an image signal is displayed in the sub window, the image processing section 3 may perform the aspect ratio adjustment process, so that the input image signal is displayed on the whole sub window.

The description will be given with reference to FIG. 24 again. The scaling section 32 scales the YUV signals (Yin, Uin, Vin) as the input image signals, based on the computing result Cout (scaling ratio) by the computing section 31 (step S3). Next, the position adjusting section 33 adjusts the position, for example, as shown in FIG. 29C described above for the image signals scaled by the scaling section 32 to prevent loss of the subtitles in the black band region (step S4). Finally, determination is made whether the aspect ratio adjustment process is terminated (step S5). When determination is made that the aspect ratio adjustment process is not terminated (step S5: N), the processes of steps SO to S4 are repeated. When determination is made that the aspect ratio adjustment process is terminated (step S5: Y), the aspect ratio adjustment process is terminated.

As above, based on the black band detection result Kout by the black band detecting section 2, the image processing by the image processing section 3 (aspect ratio adjustment process of the input image signal) is performed.

As described above, in this embodiment, the measuring section 22 measures whether the measurement regions 64A and 64B of the YUV signals (Yin, Uin, Vin) as the input image signal 6 have the signal level under the threshold value Vt for each pixel in the unit frame period. In addition, based on the measurement result, the detecting section 23 detects the black band region included in the input image signal 6. Therefore, compared to the related arts, the black band region included in the input image signal can be detected in a shorter time.

Further, the measuring section 22 and the detecting section 23 detect the boundary between the black band region and the image region based on the result from the measurement for each pixel whether the signal level is under the threshold value Vt, set a new measurement region by adding or subtracting one half of the previous increment/decrement value as a new increment/decrement value to or from the previous measurement region according to the result whether the boundary is detected, sequentially measure the new measurement region, and detect the black band region based on the measurement result. Therefore, the black band region included in the input image signal 6 can be detected in a shorter time.

Further, the detection determining section 237 in the detecting section 23 determines whether the width of the black band region is changed, and if changed, determines whether only one of widths of two black band detection regions is largely changed. Therefore, when only one thereof is largely changed, determination can be made that the image signal is a black scene or the like, and thus false detection of the black band region can be prevented. In the result, it is possible to prevent such false detection, and precise black band detection can be performed.

Further, since such precise black band detection can be performed in a short time, the image processing section 3 can perform optimum image processing by using the black band detection result Kout in a short time.

Further, while the aspect ratio of the image region that is the remaining region after excluding the black band region of the input image signal is maintained, the input image signal can be scaled. Therefore, by displaying an image with the use of the scaled image signal, an extremely viewable image can be displayed compared to the related arts.

Further, expansion or reduction or the image signal is performed considering presence of subtitles in the black band region as well. Therefore, an image including the black band region can be displayed without loss of the subtitles.

Further, the display position of the image signal can be adjusted by the position adjusting section 33, according to presence of the subtitles in the black band region or the like. Therefore, a more viewable image can be provided.

Further, image processing is performed by using the black band detection result Kout detected by the black band detecting section 2 at a high speed. Therefore, the scaling ratio can be recalculated according to a change in the input image signal, and the aspect ratio can be adjusted in real time.

The invention has been described with reference to the embodiment. However, the invention is not limited to the embodiment, and various modifications may be made.

For example, in the foregoing embodiment, the description has been given of the black band detection on the CinemaScope image signal in which the black band regions are present above and below the image region or the side panel image signal in which the black band regions are present on the right and left of the image region. However, it is possible to detect the black band regions in four directions, that is, black band regions on the above, below, right and left sides of the image region by combining the foregoing black band detection.

Further, in the foregoing embodiment, the description has been given of the case that the black band detection is performed by binary search by using the measurement result by the measuring section 22. However, the black band detection method by the black band detecting section 2 is not limited thereto, but may be any method in which the black band can be detected in a unit frame period.

Further, in the foregoing embodiment, the description has been given of the image display to which the YUV signals are inputted. However, the invention can be also applied to an image display or the like to which the RGB signals are directly inputted such as a PC. When the RGB signals are directly inputted as above, matrix conversion is not necessarily performed, and thus the matrix circuit 41 becomes unnecessary.

Further, in the foregoing embodiment, the description has been given of a TV as a specific example of the image display. However, the image display of the invention can be also applied to a PDA (Personal Digital Assistants), a mobile phone or the like.

It should be understood by those skilled in the art that various modifications, combinations, sub-combinations and alternations may occur depending on design requirements and other factors insofar as they are within the scope of the appended claims or the equivalents thereof.

What is claimed is:

1. An image signal processing apparatus comprising:
a basic region providing means for providing a basic region as a basic part to be measured for an input image signal;
an increment/decrement value providing means for providing an increment/decrement value in a measurement region;
a measurement region determining means for determining the measurement region on the basis of the basic region and the increment/decrement value;
a measuring means for measuring in a unit frame period whether each pixel in a designated measurement region of the input image signal has a signal level less than a threshold value;
a black band detecting means for detecting in the unit frame period a black band region included in the input image signal based on a measurement result from the measuring means;
a calculating means for calculating a scaling ratio of the input image signal while maintaining an aspect ratio thereof, based on a detection result from the black band detecting means; and
a scaling means for scaling the input image signal up or down, based on the ratio obtained by the calculating means,
wherein the increment/decrement value providing means resets the increment/decrement value to half of the previous value,
the measurement region determining means selectively resets a new measurement region by adding or subtracting the new increment/decrement value to or from the previous measurement region depending on whether the boundary between a black band region and an image region is detected by the black band detecting means, and
the measuring means performs the measurement on a new measurement region.

2. The image signal processing apparatus according to claim 1, wherein the measuring means concurrently measures the measurement region in two directions, that is, a horizontal direction and the vertical direction.

3. An image display comprising:

a basic region providing means for providing a basic region as a basic part to be measured for an input image signal;

an increment/decrement value providing means for providing an increment/decrement value in a measurement region;

a measurement region determining means for determining the measurement region on the basis of the basic region and the increment/decrement value;

a black band detecting means for detecting in a unit frame period a black band region included in an input image signal;

a calculating means for calculating a scaling ratio of the input image signal while maintaining an aspect ratio thereof, based on a detection result from the black band detecting means;

a scaling means for scaling the input image signal up or down, based on the ratio obtained by the calculating means; and a display means for displaying an image based on the scaled image signal, wherein the increment/decrement value providing means resets the increment/decrement value to half of the previous value, the measurement region determining means selectively resets a new measurement region by adding or subtracting the new increment/decrement value to or from the previous measurement region depending on whether the boundary between a black band region and an image region is detected by the black band detecting means, and the measuring means performs the measurement on a new measurement region.

* * * * *